(12) United States Patent
Hopperstad et al.

(10) Patent No.: US 9,360,578 B2
(45) Date of Patent: Jun. 7, 2016

(54) SYSTEMS AND METHODS FOR OPTIMIZING LOW FREQUENCY OUTPUT FROM AIRGUN SOURCE ARRAYS

(75) Inventors: Jon-Fredrik Hopperstad, Cambridge (GB); Robert Laws, Cambridge (GB); John Richard Tulett, Yokohama (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 990 days.

(21) Appl. No.: 13/450,477

(22) Filed: Apr. 19, 2012

(65) Prior Publication Data

US 2012/0218869 A1 Aug. 30, 2012
US 2016/0097869 A9 Apr. 7, 2016

Related U.S. Application Data

(63) Continuation-in-part of application No. 13/112,869, filed on May 20, 2011, now Pat. No. 9,025,417.

(60) Provisional application No. 61/376,464, filed on Aug. 24, 2010, provisional application No. 61/568,655, filed on Dec. 9, 2011.

(51) Int. Cl.
*G01V 1/38* (2006.01)

(52) U.S. Cl.
CPC ........ *G01V 1/3861* (2013.01); *G01V 2210/127* (2013.01); *G01V 2210/1212* (2013.01); *G01V 2210/1293* (2013.01)

(58) Field of Classification Search
CPC .................................................. G01V 1/3861
USPC ........................................................ 367/144
See application file for complete search history.

(56) References Cited

U.S. PATENT DOCUMENTS

| 3,379,273 | A | * | 4/1968 | Chelminski | 367/144 |
|---|---|---|---|---|---|
| 3,437,170 | A | * | 4/1969 | Brock et al. | 181/120 |
| 3,506,085 | A | * | 4/1970 | Loper | 367/144 |
| 3,601,216 | A | * | 8/1971 | Mott-Smith | 181/115 |
| 3,739,869 | A | * | 6/1973 | Mayne | 181/120 |
| 3,893,539 | A | * | 7/1975 | Mott-Smith | 181/115 |
| 3,915,257 | A | * | 10/1975 | Dunlap et al. | 181/114 |
| 4,038,630 | A | * | 7/1977 | Chelminski | 367/23 |
| 4,108,272 | A | * | 8/1978 | Paitson | G01V 1/137 |
| | | | | | 181/115 |

(Continued)

FOREIGN PATENT DOCUMENTS

| EP | 0320073 | 6/1989 |
|---|---|---|
| GB | 2092750 | 8/1982 |
| WO | 98/48301 | 10/1998 |

OTHER PUBLICATIONS

Pengyao, Z, et al., "Study and simulation of Larrge Volumne Air-gun Array Based on Ziolokowski Model", IFITA, 2010. Int'l forum on Jul. 16-18, 2010, pp. 450-453.

(Continued)

*Primary Examiner* — Ari M Diacou
(74) *Attorney, Agent, or Firm* — Daryl R. Wright; Jody DeStefanis

(57) ABSTRACT

A technique provides a source design and method for increasing low frequency output of a marine source array. The approach comprises providing a plurality of airguns. At least some of the airguns are activated to generate an effective bubble energy. The effective bubble energy may be optimized through use, preparation and/or arrangement of the airguns.

8 Claims, 12 Drawing Sheets

(56) References Cited

U.S. PATENT DOCUMENTS

| | | | | |
|---|---|---|---|---|
| 4,114,723 | A | * | 9/1978 | Paitson et al. ............... 181/120 |
| 4,271,924 | A | * | 6/1981 | Chelminski ................. 181/120 |
| 4,382,486 | A | * | 5/1983 | Ruehle ........................ 181/118 |
| 4,493,061 | A | * | 1/1985 | Ray ....................... G01V 1/006 181/111 |
| 4,718,045 | A | * | 1/1988 | Desler ................... G01V 1/137 181/110 |
| 4,735,281 | A | * | 4/1988 | Pascouet ............... G01V 1/387 181/115 |
| 4,875,545 | A | * | 10/1989 | Pascouet ..................... 181/115 |
| 4,949,315 | A | * | 8/1990 | Pascouet ..................... 367/144 |
| 4,956,822 | A | * | 9/1990 | Barber et al. ................ 367/23 |
| 5,420,829 | A | * | 5/1995 | Pascouet ..................... 367/144 |
| 5,469,404 | A | * | 11/1995 | Barber et al. ................ 367/23 |
| 6,606,278 | B2 | | 8/2003 | Lee et al. |
| 7,218,572 | B2 | | 5/2007 | Parkes |
| 9,025,417 | B2 | | 5/2015 | Hopperstad et al. |
| 2004/0000446 | A1 | * | 1/2004 | Barber, Sr. .................. 181/120 |
| 2005/0259513 | A1 | * | 11/2005 | Parkes ................... G01V 1/006 367/23 |
| 2006/0076183 | A1 | | 4/2006 | Duren et al. |
| 2008/0011540 | A1 | | 1/2008 | Noldoveanu et al. |
| 2008/0144442 | A1 | * | 6/2008 | Combee et al. ............... 367/131 |
| 2009/0188672 | A1 | | 7/2009 | Norris et al. |
| 2012/0048642 | A1 | * | 3/2012 | Hopperstad .......... G01V 1/3861 181/120 |

OTHER PUBLICATIONS

Beaty, L.G., "Bubble frequencies of air gun sources", Sep. 6, 1972.
International Search Report for the equivalent PCT patent application No. PCT/US2012/038751 issued on Nov. 30, 2012.
B.F. Giles, et al., "System approach to air-gun array design," Geophysical Prospecting, 1973, vol. 21, Issue 1, pp. 77-101.
F.S. Kramer, et al, "Seismic Energy Sources," Offshore Technology Conference, 1969, OTC 1119, pp. II388-II410..S. Kramer, et al, "Seismic Energy Sources," Offshore Technology Conference, 1969, OTC 1119, pp. II388-II410.
A.P. Ziolkowski, et al, "Use of low frequencies for sub-basalt imaging," Geophysical Prospecting, 2003, vol. 51, Issue 3, pp. 169-182.
Z.C. Lunnon, et al, "An evaluation of peak and bubble turning in sub-basalt seismology: modelling and results from OBS data," First Break, vol. 21, No. 12, Dec. 1, 2003, pp. 51-56.
S. Shimizu, et al., "Short-Cluster Airgun Array for Shallow to Deep Crustal Survey," International Journal of Offshore and Polar Engineering, vol. 19, No. 1, Mar. 1, 2009, pp. 60-65.
R.M. Laws, et al, "Computer modelling of clustered airguns," First Break, vol. 8, No. 9, Sep. 1, 1990, pp. 331-338.
Examination report for the equivalent European patent application number.
Examination report for the equivalent European patent application No. 12789555.5 issued on Sep. 24, 2015.

\* cited by examiner

SYSTEMS AND METHODS FOR OPTIMIZING LOW FREQUENCY OUTPUT FROM AIRGUN SOURCE ARRAYS

CROSS-REFERENCE TO RELATED APPLICATIONS

This application claims the benefit of U.S. Provisional Patent Application No. 61/568,655, filed Dec. 9, 2011, and U.S. patent application Ser. No. 13/112,869, filed May 20, 2011, which, in turn, claims the benefit of U.S. Provisional Patent Application No. 61/376,464, filed Aug. 24, 2010, which are incorporated herein by reference in their entirety.

TECHNICAL FIELD

The present disclosure relates in general to seismic source arrays, and more particularly to systems and methods for optimizing low frequency output of such source arrays.

BACKGROUND

In seismic applications, airgun source arrays are often used to generate acoustic output, which when reflected off of subsurface formations may be detected by associated seismic receivers. Such data may be used to build up an image of subsurface formations for assessing the likelihood of hydrocarbon production.

The low frequency output of marine airgun seismic sources is limited by the resonance frequency of the largest airgun bubble volume in the source array. This oscillation frequency, also referred to as the fundamental bubble frequency, is given by the well-known Rayleigh-Willis formula:

$$f = k \frac{\left(1 + \frac{d}{10}\right)^{\frac{5}{6}}}{(P \cdot V)^{\frac{1}{3}}} \quad (1)$$

Where f is the bubble frequency measured in Hertz, d is the source depth in meters, P is the firing pressure in psi (pound per square inch), V is the airgun chamber volume in cubic inches and k is an empirical constant; k=506 matches well with measurements of conventional airguns.

Decreasing the bubble frequency requires a bigger bubble volume. The volume increase should be substantial since the bubble frequency is inversely proportional to the cube-root of the airgun chamber volume. Some have recommended increasing the largest bubble volume as a way to increase the low frequency source output.

When airguns fire in a cluster, the resulting bubble frequency substantially equals that of a single gun of the combined volume. Earlier work on cluster design focused on maximizing the primary-to-bubble ratio of the resulting source signature. Such is the airgun cluster design in use today, where the clustered airguns are typically separated by less than one metre, and where the airgun bubbles coalesce into one non-spherical bubble. Other airguns in the source array are only weakly interacting, and the volume of these guns is normally chosen to achieve maximum destructive interference of the bubble amplitude of the overall source signature. This is known as a 'tuned array'.

SUMMARY

The present disclosure describes a source design and method for increasing low frequency output of a marine source array. The approach comprises providing a plurality of airguns. At least some of the airguns are activated to generate an effective bubble energy that may be optimized through specific use, preparation and/or arrangement of the airguns.

BRIEF DESCRIPTION OF THE DRAWINGS

The foregoing and other features and aspects of the present disclosure will be best understood with reference to the following detailed description of specific embodiments of the disclosure, when read in conjunction with the accompanying drawings, wherein.

DETAILED DESCRIPTION

Figure 1:
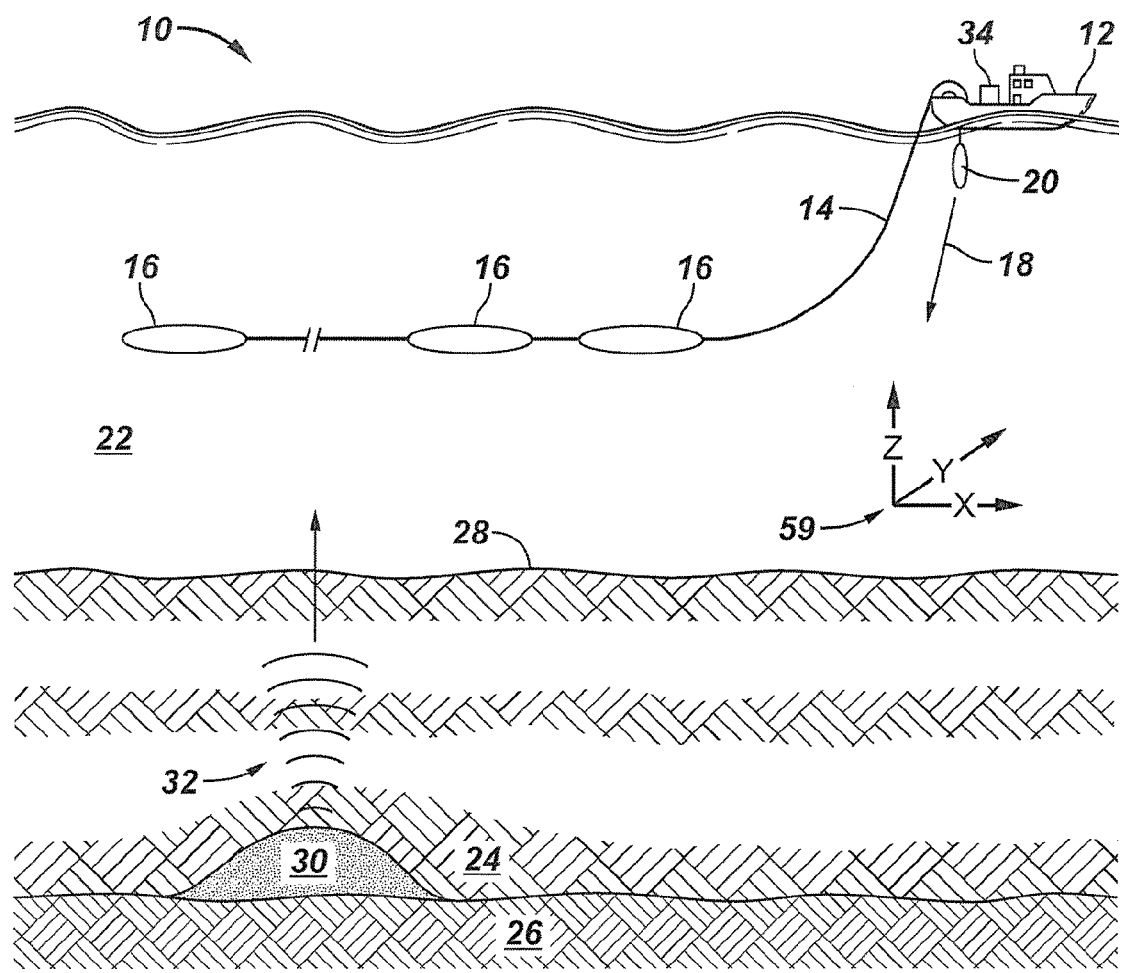
FIG. 1 is a schematic diagram of a marine seismic data acquisition system according to an embodiment of the disclosure.

Refer now to the drawings wherein depicted elements are not necessarily shown to scale and wherein like or similar elements are designated by the same reference numeral through the several views.

FIG. 1 depicts an embodiment 10 of a marine seismic data acquisition system in accordance with some embodiments of the disclosure. In the system 10, a survey vessel 12 tows one or more seismic streamers 14 (one example of streamers 14 being depicted in FIG. 1). The seismic streamers 14 may be several thousand meters long and may contain various support cables (not shown), as well as wiring and/or circuitry (not shown) that may be used to support communication along the streamers 14. In general, each streamer 14 includes a primary cable into which is mounted seismic sensors 16 that record seismic signals. It is to be appreciated that the sensors 16 are illustrated schematically for emphasis in FIG. 1, and that in practice, the sensors 16 may be disposed within the streamer cable 14. The seismic sensors 16 may include pressure sensors (e.g., hydrophones) and/or particle motion sensors (e.g., accelerometers).

The marine seismic data acquisition system 10 includes a seismic source 20 that typically takes the form of an array of airguns. In some embodiments of the disclosure, the seismic source 20 may be towed by the survey vessel 12. In other embodiments, the seismic source 20 may operate independently of the survey vessel 12, in that the seismic source may be coupled to other vessels, buoys or rigs, as just a few examples.

As the seismic streamers 14 are towed behind the survey vessel 12, acoustic signals 18 (an example of an acoustic signal 18 is depicted in FIG. 1) are produced by the seismic source 20 and are directed down through a water column 22 into strata 24 and 26 beneath a water bottom surface 28. The acoustic signals 18 are reflected from the various subterranean geological formations, such as an exemplary formation 30 that is depicted in FIG. 1. The incident acoustic signals 18 produce corresponding reflected acoustic signals, or pressure waves 32, which are sensed by the seismic sensors 16.

The seismic acquisition enables the buildup of an image of a survey area for purposes of identifying subterranean geological formations, such as the exemplary geological formation 30. Subsequent analysis of the representation may reveal probable locations of hydrocarbon deposits in subterranean geological formations. Depending on the particular embodiment of the disclosure, portions of the analysis of the representation may be performed on the seismic survey vessel 12, such as by a signal processing unit 34.

Figure 2:
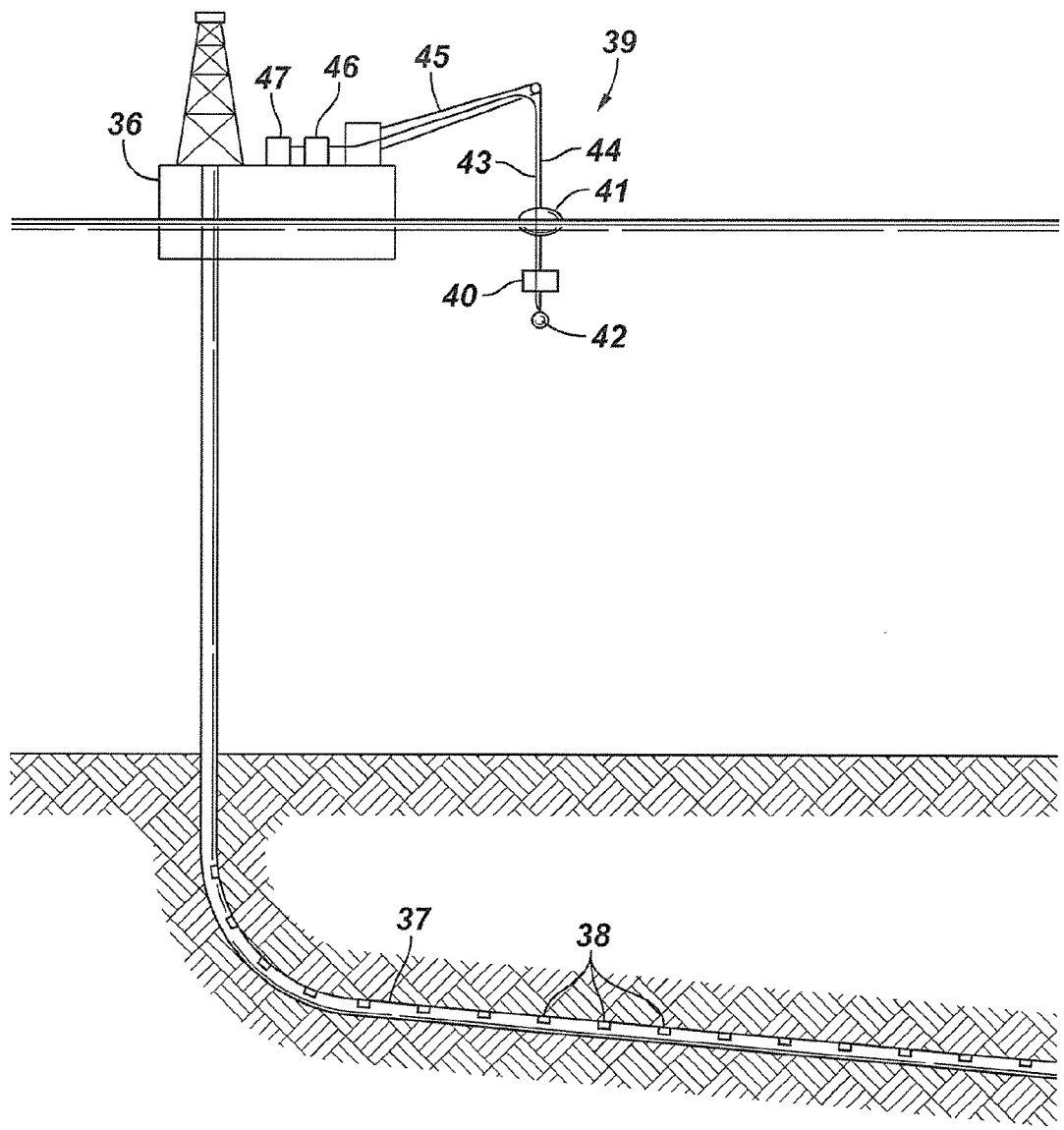
FIG. 2 is a schematic diagram of a VSP arrangement according to an embodiment of the disclosure.

In addition to towed marine applications, the present disclosure also is applicable to VSP surveys. A vertical seismic profile (VSP) is a class of borehole seismic measurements used for correlation between surface seismic receivers and wireline logging data. VSPs can be used to tie surface seismic data to well data, providing a useful tie to measured depths. Typically VSPs yield higher resolution data than surface seismic profiles provide. VSPs enable converting seismic data to zero-phase data and enable distinguishing primary reflections from multiples. In addition, a VSP often is used for analysis of portions of a formation ahead of the drill bit. Referring to FIG. 2, a simplified view of an offshore rig 36 positioned over a subsea borehole 37 is shown. The borehole 37 contains a plurality of spaced receivers 38 to facilitate, for example, a VSP acquisition. The receivers 38 can be deployed in the borehole 37 with a variety of methods and systems, including a wireline cable; a downhole assembly, e.g. drill collars; permanent fixation to a side of the borehole; or with other suitable techniques. The rig 36 is shown supporting a conventional seismic survey apparatus designated generally as 39. The survey apparatus 39 includes a source 40, which takes the form of an air-gun or guns suspended below the surface by a float 41. An analog hydrophone 42 is suspended below the air guns 40 and may provide information for correcting time break errors (errors attributable to time differences for swells, irregular source firings, etc.).

One or more analog lines 43 form part of an umbilical 44 that may also include an airline. The analog lines 43 traverse a handling system, such as a crane 45. The analog lines 43 provide an analog communications/control link between the guns 40, the hydrophone 42, a gun controller 46, and a computer processor 47.

Having generally described an example of a seismic data acquisition process and a VSP technique, attention is now directed to the seismic source 20 (FIG. 1), 40 (FIG. 2), which may take the form of an airgun cluster. In VSP applications, seismic sources are normally comprised of airgun clusters; e.g. one to four clusters, wherein each cluster includes, for example, two to four airguns. Airgun clusters also are prevalent in source arrays for towed marine, seabed seismic and some borehole seismic applications. The teachings of the present disclosure may be utilized in any of the aforementioned settings.

The widespread use of airgun clusters can be attributed to two main characteristics. First, clustering of medium sized airguns can achieve the same bubble frequency as a large single airgun with the same total volume. Airgun clusters are considered more robust and easier to handle than large single airguns. Secondly, airgun clusters have a higher peak-to-bubble ratio than the equivalently sized single airgun, and are therefore well-suited for tuned arrays.

Figure 3:
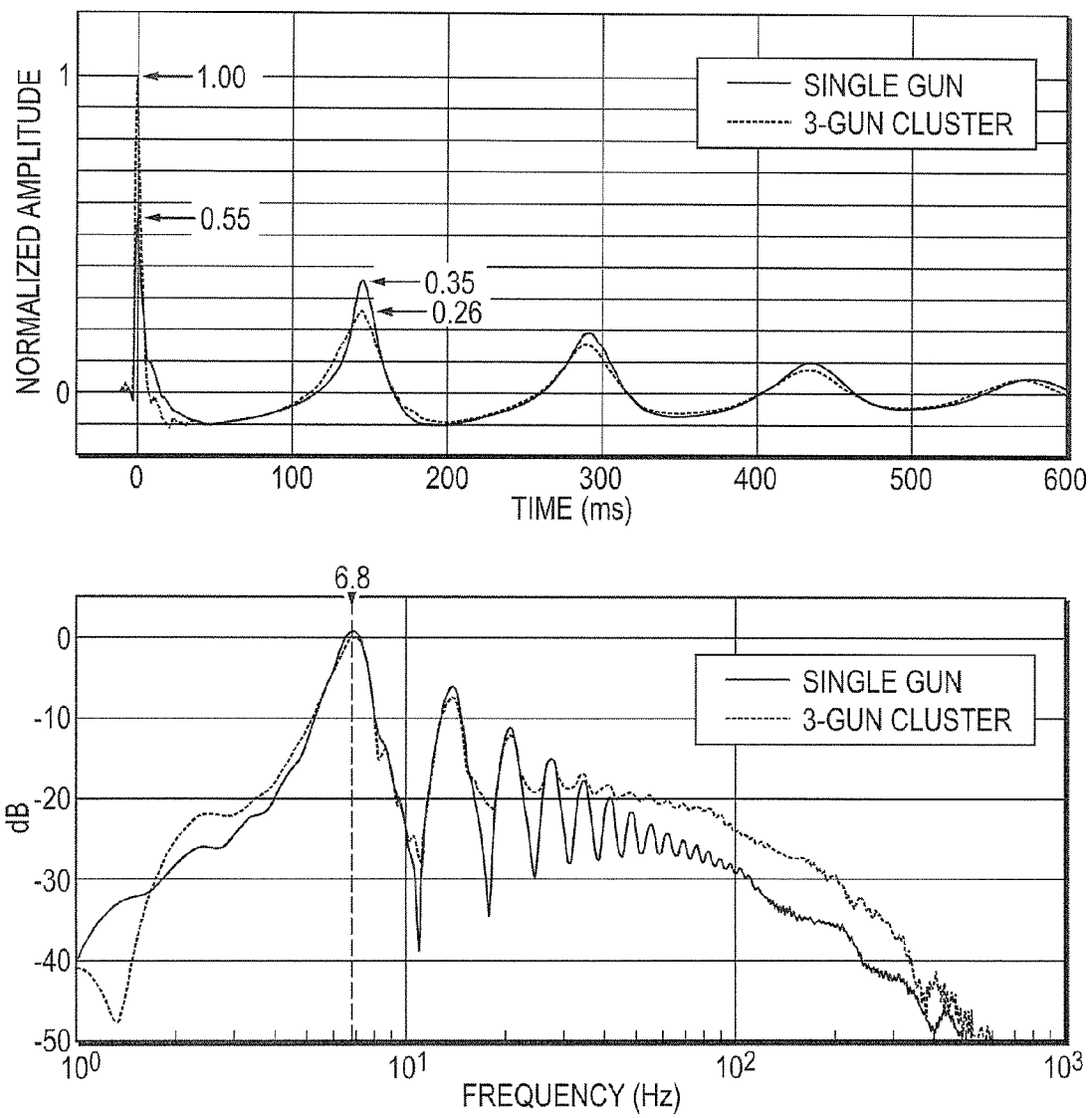
FIG. 3 is a graphical depiction of a source signature of conventional gun arrangements.

The higher peak-to-bubble ratio associated with airgun clusters is illustrated in the top panel of FIG. 3, which compares a single airgun of about 600 in$^3$ with a three-gun cluster with the same total volume; the measurement bandwidth is 0-500 Hz. The three-gun cluster has a primary-to-bubble ratio of 1.00/0.26≈3.9, while the single airgun has a primary-to-bubble ratio of 0.55/0.35≈1.6. The higher peak-to-bubble ratio manifests itself in a flatter spectrum in the bottom panel of FIG. 3.

The spectral comparison also indicates that the output at the bubble frequency, i.e. 6.8 Hz, is substantially identical. It has been found that no matter how you arrange the cluster to release the air, the spectral level at the bubble frequency is substantially the same. In accordance with this observation, an initial embodiment of the present disclosure seeks to optimize low frequency output by implementing large airgun cluster(s), whose volume is larger than what is considered practical for a single airgun.

The low frequency output of airgun sources is limited by the resonance frequency of the largest bubble volume in the array. In conventional seismic sources, and especially for source arrays used in towed marine, the volume of the largest bubble is small compared with the total source volume. Accordingly, there is scope for increasing the low frequency output, without increasing the total gas volume, by shifting the bubble frequency towards zero. The lower resonance frequency is achieved by releasing a larger amount of gas into one big bubble or multiple frequency locked bubbles.

Airgun bubbles can exhibit cluster-type oscillation frequency even at non-coalescing distances. For example, the bubbles from two closely spaced airguns of different volume may oscillate with the same frequency (the frequency of the combined volume), even though the bubbles are not coalescing. In fact, they may not even be touching. The bubble interaction is entirely through the pressure field. This phenomenon is known as frequency locking. Bubbles are 'fully frequency locked' when their bubble frequency substantially equals that associated with the combined volume. Not fully interacting bubbles are commonly referred to as 'partially frequency locked', and as 'non-interacting' when the presence of the other bubbles do not affect the oscillation frequency.

Figure 4:
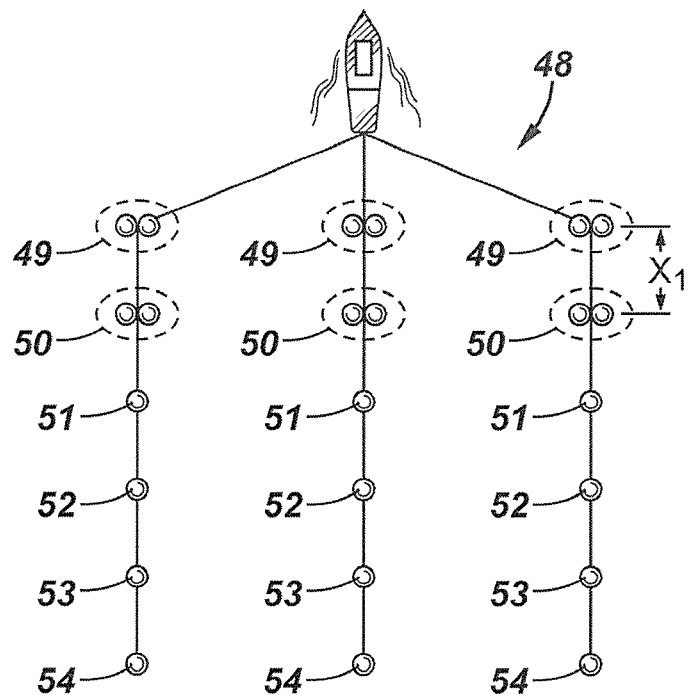
FIG. 4 is a schematic depiction of a tuned conventional source array.

FIG. 4 depicts an example of a typical prior art airgun array 48 in which single and clustered airguns are spaced at 3 meters in the in-line direction. The largest cluster 49 in the array 48 has a volume of 2×290 in$^3$=580 in$^3$. The two cluster bubbles are fully frequency locked to each other, and partially frequency locked to an adjacent cluster 50, which has a volume of 2×195 in$^3$. Accordingly, the 2×290 in$^3$ bubbles oscillate with a frequency corresponding to an effective volume of about 750 in$^3$. The array 48 further includes single airguns 51, 52, 53, 54 with volumes 280 in$^3$, 195 in$^3$, 145 in$^3$, 105 in$^3$, respectively, resulting in a total volume of each string/subarray of 1695 in$^3$ and a total source array volume of 5085 in$^3$. Thus, the largest bubble in array 48 uses only 750/1695≈44% of the available subarray volume, and only 750/5085≈15% of the total source volume available. "Source volume" as used in the present disclosure means the total volume of airguns fired at each shot and excludes volumes that could be generated by guns (e.g., spare guns) not used during the shot. These numbers are quite typical for prior art source arrays. The total high pressure gas capacity available is used to generate many weakly interacting bubbles, and the largest bubble is small compared with the total source volume.

In contrast, source designs according to the present disclosure aim to optimize the use of available high pressure gas capacity for generating very low frequencies. To extend the source bandwidth as much as possible towards zero Hertz, substantially all of the available high pressure gas should be released into one huge bubble oscillation. This can be achieved with an airgun cluster wherein some or all cluster bubbles are fully frequency locked, i.e., the cluster bubbles oscillate with the frequency associated with the total cluster volume. Various examples of implementing the teachings of the present disclosure will now be described. It is to be appreciated, however, that these are merely examples and other methods and arrangements of achieving full frequency locking of cluster bubbles are contemplated as falling within the scope of the present disclosure.

EXAMPLE 1

Source Array Wherein the Largest Bubble is One-Third of the Total Source Volume

In an embodiment of the present disclosure, the largest quantity of high pressure gas possible is released into one location to maximize the very low frequency output. There might be several factors limiting the largest bubble in an array, e.g. the total source volume may be limited by the onboard compressor capacity and the seismic shot interval. The total source volume also may be limited by the flow capacity of the conduits (e.g., hoses) connecting the source and the onboard compressor or onboard high pressure reservoir, or it may be limited by the number of high pressure hoses the ship can tow.

Figure 5:
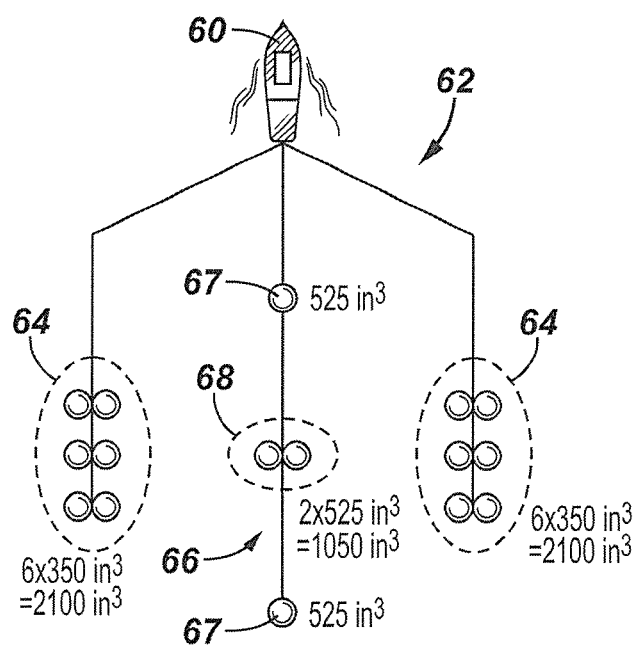
FIG. 5 is a schematic depiction of a source array designed to optimize low frequency output according to the principles of the present disclosure.

Similarly, the largest bubble in the source array might be limited by how much of the total source volume can be released into substantially one location. FIG. 5 depicts one embodiment of the present disclosure in which the largest bubble is limited by the flow capacity of the high pressure hoses that connect the source to the vessel. A vessel 60 tows a source array 62, which includes a pair of substantially identical subarrays 64 disposed about another subarray 66 (which includes a pair of single airguns 67 disposed about a cluster 68 in the in-line direction). The cross-line spacing between subarrays 64 and 66 is, for example, 6 meters and the in-line spacing between each of the single airguns 67 and the cluster 68 is, for example, 6 meters. In this embodiment, each subarray 64, 66 is charged by a shipborne high pressure reservoir via one high pressure hose, whose flow capacity is approximately 2100 in$^3$ per shot. In this example, the source array 62 is further limited by how close one can place two hoses, and consequently it may not be possible to frequency lock the bubbles from different subarrays. Hence, the largest bubble may be 2100 in$^3$. The bubble frequency associated with 2100 in$^3$ is achieved by fully frequency locking six 350 in$^3$ airgun bubbles, while the bubble frequency associated with 1050 in$^3$ is achieved by fully frequency locking two 525 in$^3$ airgun bubbles. The dashed lines indicate the regions with full frequency locking. The interaction between the regions is negligible, and it is also negligible between any region and any of the single airgun bubbles.

The effective bubble volume of the subarrays 64 is substantially 2100 in$^3$, while the subarray 66 has two distinct bubble frequencies: the frequencies associated with a bubble volumes of 1050 in$^3$ and 525 in$^3$. These volumes result in bubble frequencies that are 1/3 and 2/3 of an octave higher than the lowest bubble frequency. In this example, the outer subarrays 64 have been optimized according to the present disclosure, while the subarray 66 is used to fill-in the bubble notch frequencies in order to flatten the spectrum. In this example, the largest effective bubble volume is approximately 33.3% of the total source volume, i.e. 2100 in$^3$ out of 6300 in$^3$ total volume.

EXAMPLE 2

Source Array Wherein the Largest Bubble Equals the Total Source Volume

Figure 6:
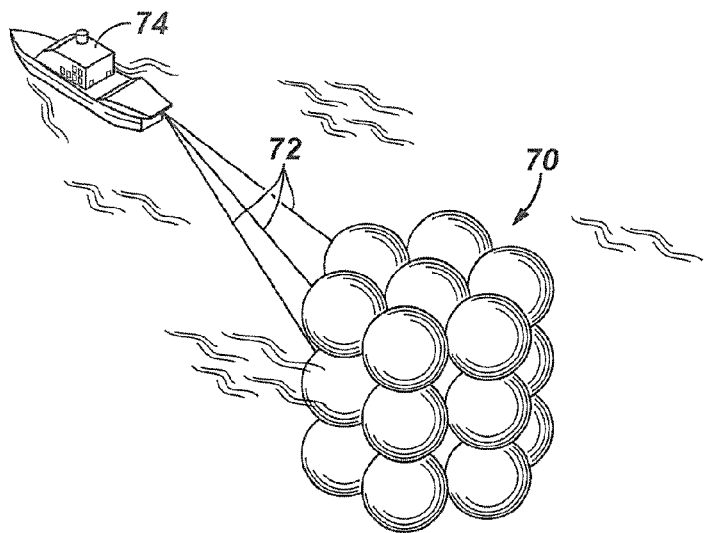
FIG. 6 is a schematic depiction of another source array designed to optimize low frequency output according to the principles of the present disclosure.

FIG. 6 depicts a schematic view of another source somewhat different than that disclosed in Example 1 and wherein all of the released gas is frequency locked into one very large airgun bubble. In the embodiment of FIG. 6, a source 70 comprises, for example, twenty-one 300 in$^3$ airgun bubbles arranged on a hexagonal grid in three layers. The airguns are connected to a plurality of high pressure hoses 72, which extend from a vessel 74. In this arrangement, the high pressure hoses 72 terminate at substantially the same location, thus enabling the guns to be positioned within full frequency locking distance. All twenty-one airgun bubbles are fully frequency locked and oscillate with the period associated with the combined volume, e.g. 6300 in$^3$. Thus, the volume of the largest effective bubble equals the total source volume. Although a specific number of airguns with specific bubble volumes are described in this example, it is to be appreciated that such numbers and volumes may be altered while still enabling full frequency locking of the array.

Figure 7:
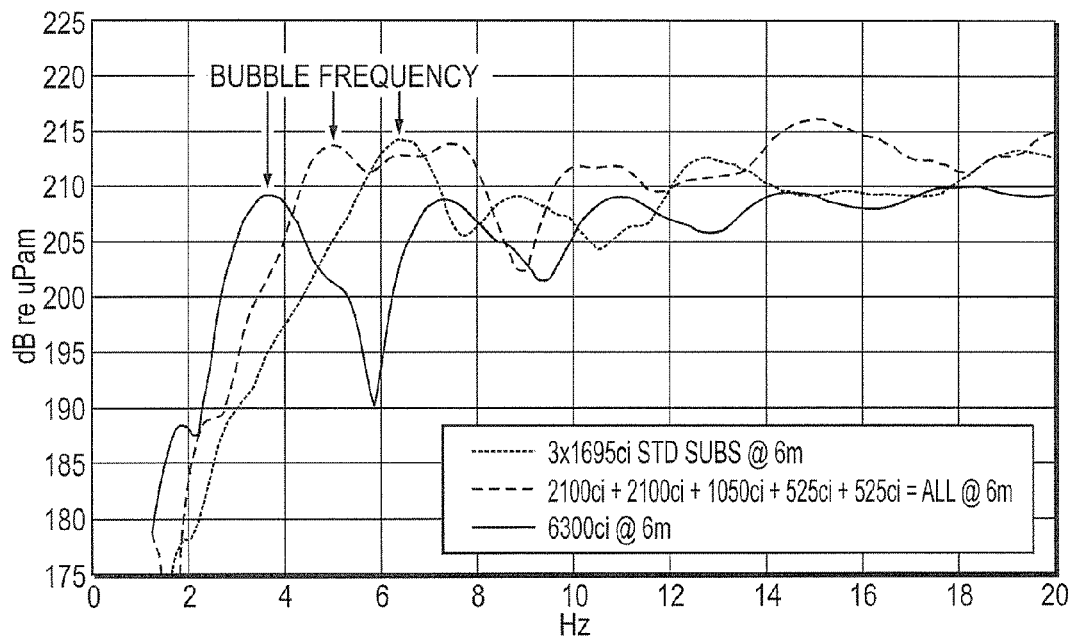
FIG. 7 is a graphical depiction comparing the optimized low frequency output source arrays of FIGS. 5 and 6 with the conventional source array of FIG. 4.

FIG. 7 compares the modeled spectra of the conventional source in FIG. 4 (dotted curve) wherein the largest effective bubble volume is 15% of the total source volume; the new source illustrated in FIG. 5 (dashed curve) wherein the largest effective bubble volume is approximately 33% of the total source volume; and the new source shown in FIG. 6 (solid curve) wherein the effective bubble volume is 100% of the total source volume. The comparison of FIG. 7 demonstrates how the low frequency output increases with the size of the effective bubble volume as both the dashed and the solid curves have significantly more low frequency output than the conventional reference spectrum (dotted curve).

EXAMPLE 3

Array Wherein the Largest Bubble Equals Half of the Total Source Volume

Figure 8:
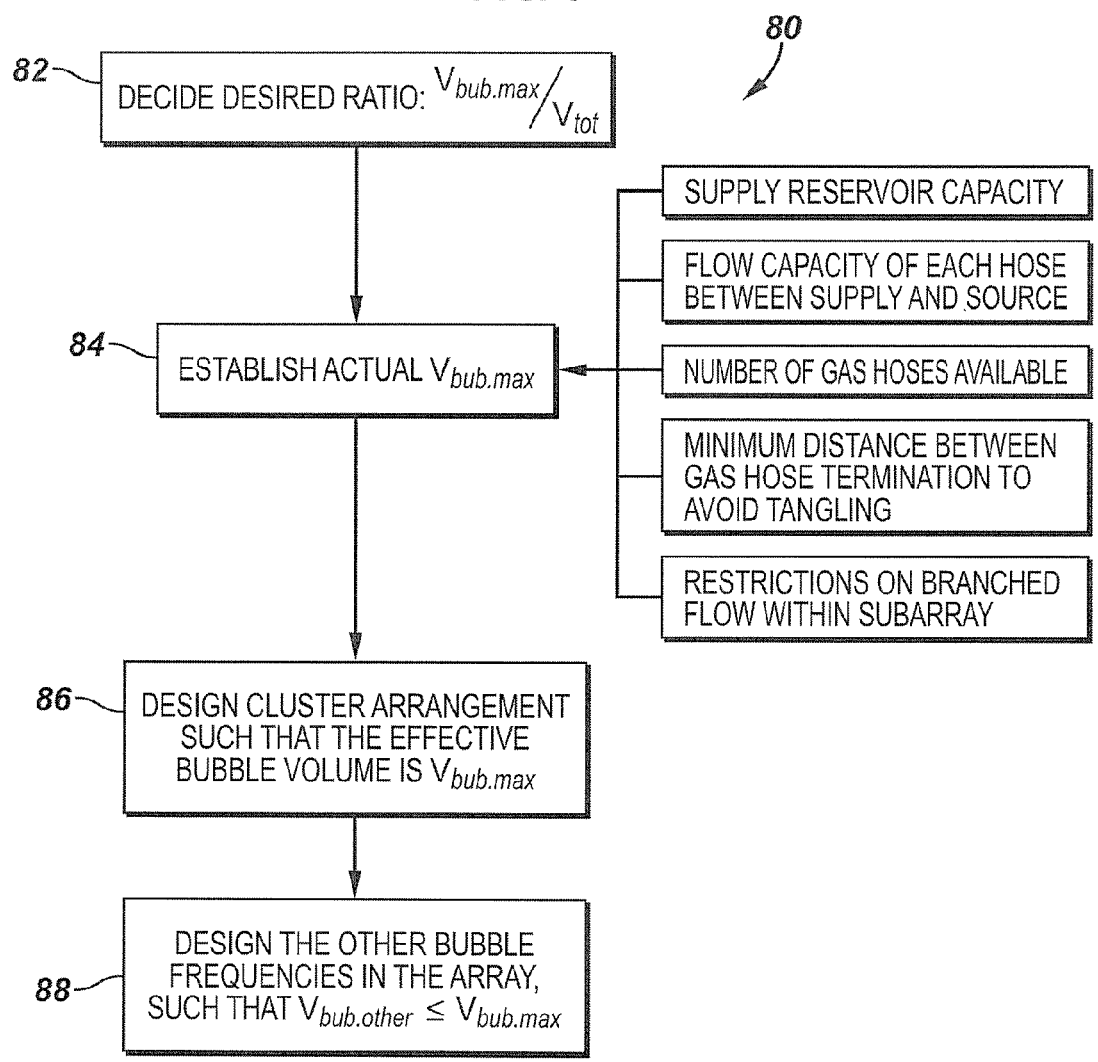
FIG. 8 is a process flow chart for designing a source array to optimize low frequency output.

In some embodiments, additional gas for tuning the source array by creating other distinct bubble frequencies may be desired. Accordingly, FIG. 8 depicts a flow chart 80 showing how a source can be designed, or re-designed, to take this into account. That is, an optimum low frequency source may be designed, while maintaining some spectral flatness given design restrictions imposed by the available equipment.

In block 82, the desired relative size of the largest effective bubble volume relative to the total source volume is determined. This desired ratio of the volume of the largest bubble in the array to the total array volume affects the trade-off between maximizing the low frequency output and flattening the spectrum by introducing additional bubble frequencies to fill-in the spectral notches. In this example, the desired size of the largest effective bubble is half of the total source volume available per shot. This ratio is 1/3 in Example 1; 1/1 in Example 2; and about 0.74 in Example 4. The ratio illustrated in block 82 is equivalent to "the desired ratio Qeff/Qtotal" of block 137 in FIG. 12.

Figure 9:
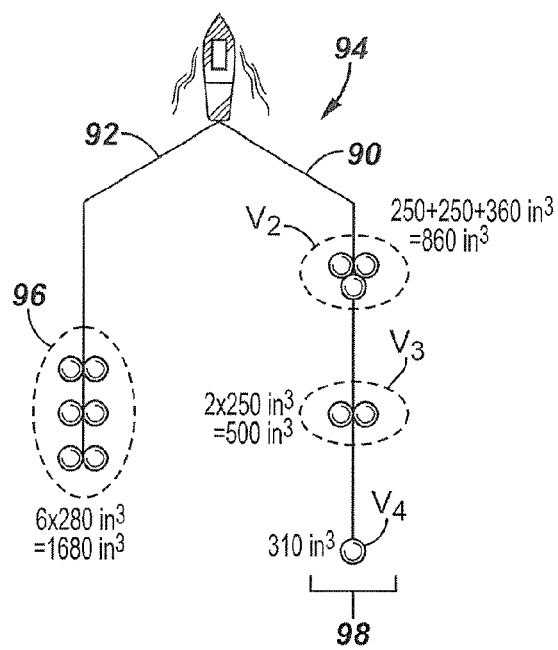
FIG. 9 is a schematic depiction of another source array designed to optimize low frequency output according to the principles of the present disclosure.

Block 84 establishes the largest effective bubble volume that may be practically achieved given the restrictions imposed by the available equipment. For example, the total source volume per shot is limited by the flow capacity per high pressure gas hose and the number of hoses available. Referring to FIG. 9, which illustrates one implementation, only two gas hoses 90, 92 from a high pressure reservoir, e.g. the shipboard compressor, and a submerged source array 94 are available, with each hose having a flow capacity of, for example, 1680 in$^3$ per shot. Thus, in this example, the desired effective volume of the largest bubble is (1680+1680)·2/3=2240 in$^3$. However, in this example, the largest effective bubble volume is further limited by how close the two strings can be positioned to avoid tangling of the equipment while towing, so it is not possible to frequency lock gas bubbles from different strings. Consequently, the actual effective volume of the largest bubble may be 1680 in$^3$. In order to optimize the bubble volume in the array (e.g., achieve as large bubble volume as practically possible), several factors can be considered, such as shown by the side blocks pointing toward block 84. For example, the largest bubble volume may be affected by the supply reservoir capacity. In other words, the output capacity of the compressor per shot may be increased to achieve maximum actual bubble volume. The largest bubble volume may also be affected by the flow capacity of each hose between the supply and source. In other words, the cross-sectional flow area of the hoses feeding the source may be increased to allow enough compressed air to be delivered to the source within a shot-recharge-cycle. To circumvent flow restriction, several gas hoses may be used in parallel so as to increase the total feed capacity. Adjacent subarrays can be suitably designed and/or arranged within locking distance such that the air released from airguns that are located on different subarrays being fed by separate hoses may be frequency-locked so as to creat the maximum bubble volume. The conduits between the high pressure supply and the airgun should contain no or minimum branched network of hoses and pipes so that there is no or insignificant restriction on the total volume of released air that can be frequency-locked.

Referring again to FIG. 8, block 86 contemplates design of an airgun cluster arrangement 96 (FIG. 9) to achieve the largest frequency-locked bubble, i.e. the one that results in the 1680 in$^3$ effective bubble volume, which corresponds to the total volume available from one gas hose. In this example, the desired bubble frequency is achieved with six 280 in$^3$ airguns in close proximity.

Block 88 of the flow chart contemplates design of other bubble frequencies in the array so as to facilitate frequency-locking of other smaller bubbles in the array. For example, instead of maximizing the low frequency output by duplicating the airgun arrangement in block 86, another airgun subarray 98 may be arranged to use the remaining gas to flatten the spectrum. In this example, three additional bubble frequencies may be uniformly distributed, on a linear frequency scale, between the first bubble frequency and its first harmonic. The Rayleigh-Willis formula in Equation 1 gives the effective bubble volume of these other bubble frequencies: $V_2=1680/(1.25)^3 \approx 860$ in$^3$, $V_3=1680/(1.50)^3 \approx 498$ in$^3$, $V_4=1680/(1.75)^3 \approx 313$ in$^3$. In this example, the second largest effective bubble volume, $V_2$, is created by a three gun cluster having two 250 in$^3$ guns and one 360 in$^3$ gun. Similarly, $V_3$ is created by a two gun cluster having two 250 in$^3$ guns, and $V_4$ is a single airgun of 310 in$^3$.

Figure 10:
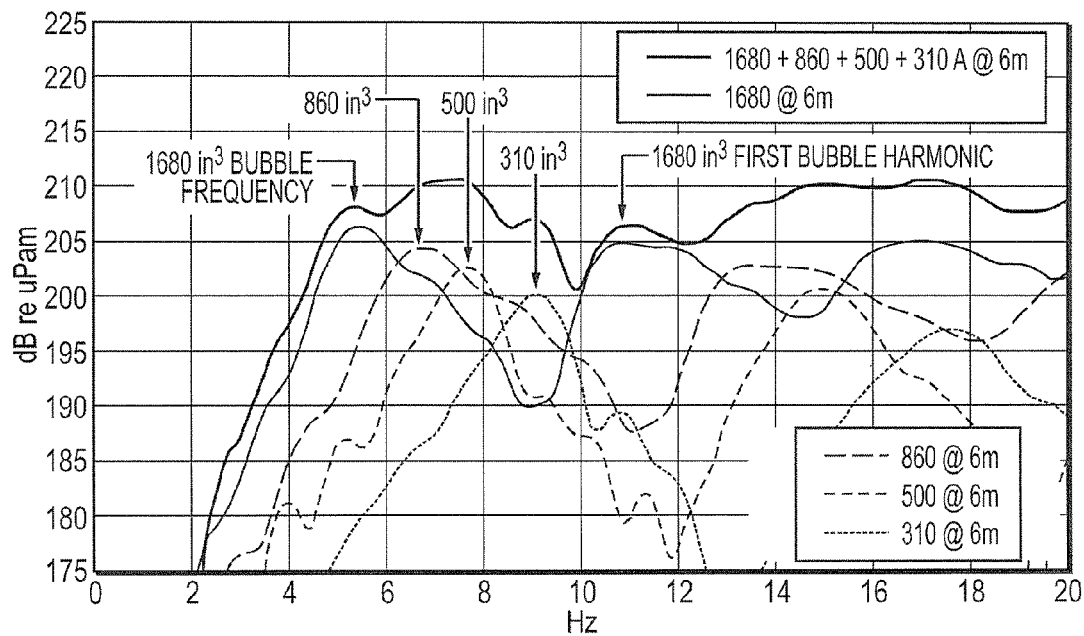
FIG. 10 is a graphical depiction of an estimated far field spectrum of the source array of FIG. 9.

Accordingly, the design of FIG. 9 achieves a largest effective bubble volume that is 50% of the total source volume, while also achieving spectral flattening using three additional bubble frequencies that are uniformly distributed between the frequency of the largest bubble and its first harmonic. The spectral flattening of this array is illustrated in FIG. 10.

EXAMPLE 4

Redesign of a Conventional Cluster Source

Figure 11A:
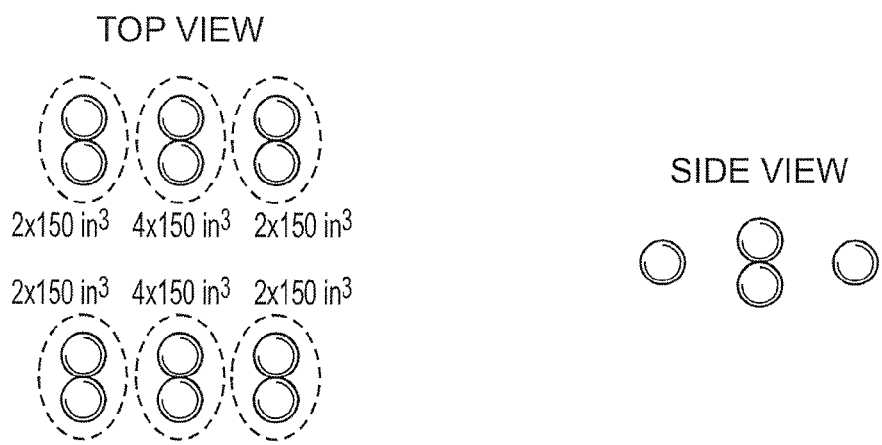
FIGS. 11a and 11b are a comparison of a conventional source array (FIG. 11a) and such source array redesigned to optimize low frequency output according to the principles of the present disclosure (FIG. 11b)

The teachings of the present disclosure provide useful methods for redesigning existing cluster arrays to optimize low frequency output. FIG. 11A depicts the layout of a conventional cluster source deployed in dual mode as described in U.S. Pat. No. 4,956,822. The prior art cluster source has been designed for enhanced spectral flatness, i.e. high primary-to-bubble ratio, with little regard for the very low frequency source output.

The value of the effective bubble volume, $V_{eff}$, can be calculated by solving the Rayleigh-Willis formula in Equation 1 for the bubble volume, V, and inputting values for air pressure (e.g., 2000 psi), source depth (e.g, 10 ft) and bubble frequency (e.g. 1/196.5 ms≈5.089 Hz).

$$V_{eff} = k^3 \frac{\left(1+\frac{d}{10}\right)^{\frac{15}{6}}}{P \cdot f^3} \quad (2)$$

Accordingly, use of these values leads to a maximum effective bubble volume of only 956 in$^3$, i.e. 40% of the total source volume of 2400 in$^3$. Although the listed values were used to define the maximum effective bubble volume of the configuration of FIG. 11A, it is to be appreciated that this definition can be used to quantify the effective bubble volume(s) of any prior art source.

According to the principles of the present disclosure, such source can be redesigned to maximize the low frequency output while using the same total amount of compressed air and maintaining some spectral flatness. Assuming that the firing pressure is the same, i.e. 2000 psi, the source depth is the same, i.e. 10 ft, and that the total volume cannot exceed 2400 in$^3$ and that there are no other restrictions on how the total volume can be distributed, the source can be redesigned to have two distinct bubble frequencies. The first bubble frequency may be defined as low as possible and the second bubble frequency may be designed as being half an octave higher than the first bubble frequency, such that the second bubble frequency will coincide with the bubble notch of the first bubble frequency. This restriction can be expressed as $$V_{bub,max} \cdot (1+2^{-3/2}) = V_{tot} \quad (3)$$

In other words, the largest effective bubble may be approximately 74% of the total source volume. Consequently, the first bubble may oscillate with a frequency associated with 1773 in$^3$ and the second bubble may oscillate with a frequency associated with 627 in$^3$. Similar to the other examples disclosed herein, such bubble oscillations are obtained by fully frequency locking multiple airgun bubbles in close proximity.

Figure 11B:
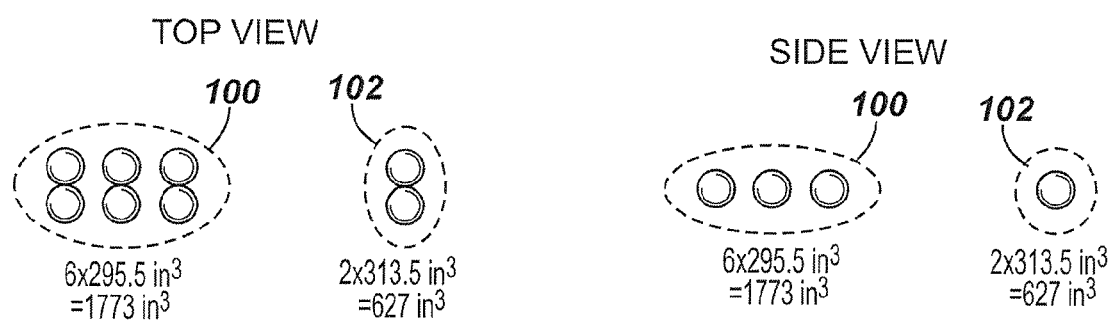

The redesigned low frequency source is depicted in FIG. 11B as having a pair of cluster units 100, 102, including a 1773 in$^3$ bubble, which may be constructed from six 295.5 in$^3$ guns, and a 627 in$^3$ bubble, which may be constructed from two 313.5 in$^3$ guns. The two cluster units are well separated such that the interaction between the cluster units is negligible. Redesigning the prior art cluster according to the principles disclosed herein increases the effective bubble volume from 956 in$^3$ to 1773 in$^3$, which at 10 ft depth corresponds to a bubble frequency of 5.1 and 4.1 Hz respectively. Accordingly, the bubble frequency has been shifted by 0.3 octave by redesigning the cluster source layout.

In the embodiments described above, the source array can be selectively redesigned to emit more low frequency output by clustering several airguns to create a large bubble. In another embodiment, an approach is used to optimize low frequency output from airgun source arrays by, for example, increasing the firing pressure, thereby enabling an even lower bubble resonance frequency. In the embodiments described above, description is provided regarding how to create a bigger bubble by frequency locking the oscillation from multiple airgun bubbles. When airguns fire in close proximity the resulting bubble oscillates with the frequency associated with the total cluster volume. In the embodiments discussed below, the approach is generalized to also account for the firing pressure. The embodiments also may be combined to utilize, for example, larger bubbles and/or more optimized firing pressure to further optimize low frequency output.

As discussed above, to maximise the very low frequency output the largest quantity of high pressure gas possible may be released into one location. There may be several factors limiting the largest bubble in the array, e.g. the total source volume may be limited by the onboard compressor capacity and the seismic shot interval; the total source volume also may be limited by the flow capacity of the hoses connecting the source and the onboard compressor or onboard high pressure reservoir, or it may be limited by the number of high pressure hoses that a ship can tow. In the previous embodiments, an assumption was made that the supply pressure was already operating at maximum capacity, while here we also consider the case of increasing the supply pressure level.

In its original form (see e.g. Kramer et al., 1969), the Rayleigh-Willis formula was expressed as a function of the potential bubble energy, Q, here defined as the product of firing pressure and the airgun chamber volume. Replacing P·V in Equation 1 with Q gives:

$$f = k \frac{\left(1 + \frac{d}{10}\right)^{\frac{5}{6}}}{Q^{\frac{1}{3}}} \quad (4)$$

Where, as before, f is the bubble frequency measured in Hertz and d is the source depth in meters. Furthermore, Q is referred to as the "bubble energy" and measured in the awkward, yet convenient, unit psi·in$^3$ (pound-per-square-inch times cubic-inches); 1 psi·in$^3 \approx 0.1130$ Joules. The empirical constant k is the same as before.

This generalized version of the Rayleigh-Willis formula can be used to calculate the bubble frequency for fully frequency locked bubbles wherein the individual airguns have been charged with different firing pressure. For this case the combined bubble energy of the frequency locked bubbles is the sum of the product of the individual airgun volume and its firing pressure:

$$Q = \sum_n P_n \cdot V_n \quad (5)$$

In this context we can describe bubble frequency locking in a more general way: when airguns fire in close proximity the airgun bubbles are frequency locked when the resulting bubble(s) oscillates with the frequency associated with the total cluster bubble energy Q. For example, creating a 5.1 Hz bubble oscillation at 6 meters depth requires a bubble energy of Q=4000·10$^3$ psi·in$^3$. This can be achieved in several ways, for example: one can frequency lock 2000 in$^3$ of air fired at 2000 psi, or one can frequency lock about 1333 in$^3$ of air fired at 3000 psi, or as a third example, one can frequency lock 1000 in$^3$ of air fired at 2000 psi with 800 in$^3$ of air fired at 2500 psi. All three examples have the same cluster bubble energy: Q=4000·10$^3$ psi·in$^3$.

Furthermore, the generalized version of the Rayleigh-Willis formula also allows us to compare the low frequency utilization of source configurations operated at different pressure levels. By rearranging Equation 4 for the bubble energy, Q, we obtain a metric that describes the "effective bubble energy", $Q_{\textit{eff}}$, of an array:

$$Q_{\textit{eff}} = k^3 \frac{\left(1 + \frac{d}{10}\right)^{\frac{15}{6}}}{f_{obs}^3} \quad (6)$$

Where $f_{obs}$ is the observed bubble frequency from source signature measurements. This definition can be used to quantify the effective bubble energy of the largest bubble in any prior art source, thereby quantifying to what degree the individual bubbles frequency lock.

EXAMPLE 5

Quantifying the Effective Bubble Energy of a Source

The effective bubble energy, as defined by Equation 6, can be used to evaluate the low frequency utilization of any source.

Assume, for example, a source configuration comprising multiple airguns. For this configuration the inter-gun distance is small enough for bubble frequency locking to occur, but it is not clear how many bubbles frequency lock and whether they fully frequency lock; i.e. oscillate with the frequency associated with the combined bubble energy. Furthermore, assume the airguns have a total volume of 2400 in$^3$, and that it has been tested at 3 m source depth at two different pressure levels with the following results:

| Source firing pressure | 2000 psi | 3000 psi |
|---|---|---|
| Observed bubble frequency | 5.10 Hz | 4.06 Hz |

Using Equation 6, one can calculate the effective bubble energy and thereby quantify the degree of frequency locking of the source.

When fired at 2000 psi, the total bubble energy of the source is $Q_{total}=2000 \cdot 2400=4800 \cdot 10^3$ psi·in³, while the effective bubble energy is:

$$Q_{eff} = 506^3 \frac{\left(1+\frac{3}{10}\right)^{\frac{15}{6}}}{5.1^3} \approx 1882 \cdot 10^3 \, psi \cdot in^3$$

which is 1882e3/(2000·2400)≈39% of the total potential bubble energy if all the individual bubbles had fully frequency locked.

Similarly, at 3000 psi the total bubble energy of the source is $Q_{total}=3000 \cdot 2400=7200 \cdot 10^3$ psi·in³, while the effective bubble energy is:

$$Q_{eff} = 506^3 \frac{\left(1+\frac{3}{10}\right)^{\frac{15}{6}}}{4.06^3} \approx 3730 \cdot 10^3 \, psi \cdot in^3$$

which is 3730e3/(3000·2400)≈52% of the total potential bubble energy.

Consequently, even though the source exhibits a larger degree of frequency locking at 3000 psi than at 2000 psi firing pressure—52% compared with 38%—the source only utilized about half of the total bubble energy to create its largest bubble.

EXAMPLE 6

Source Configuration Limited by the Supply Pressure

Figure 12:
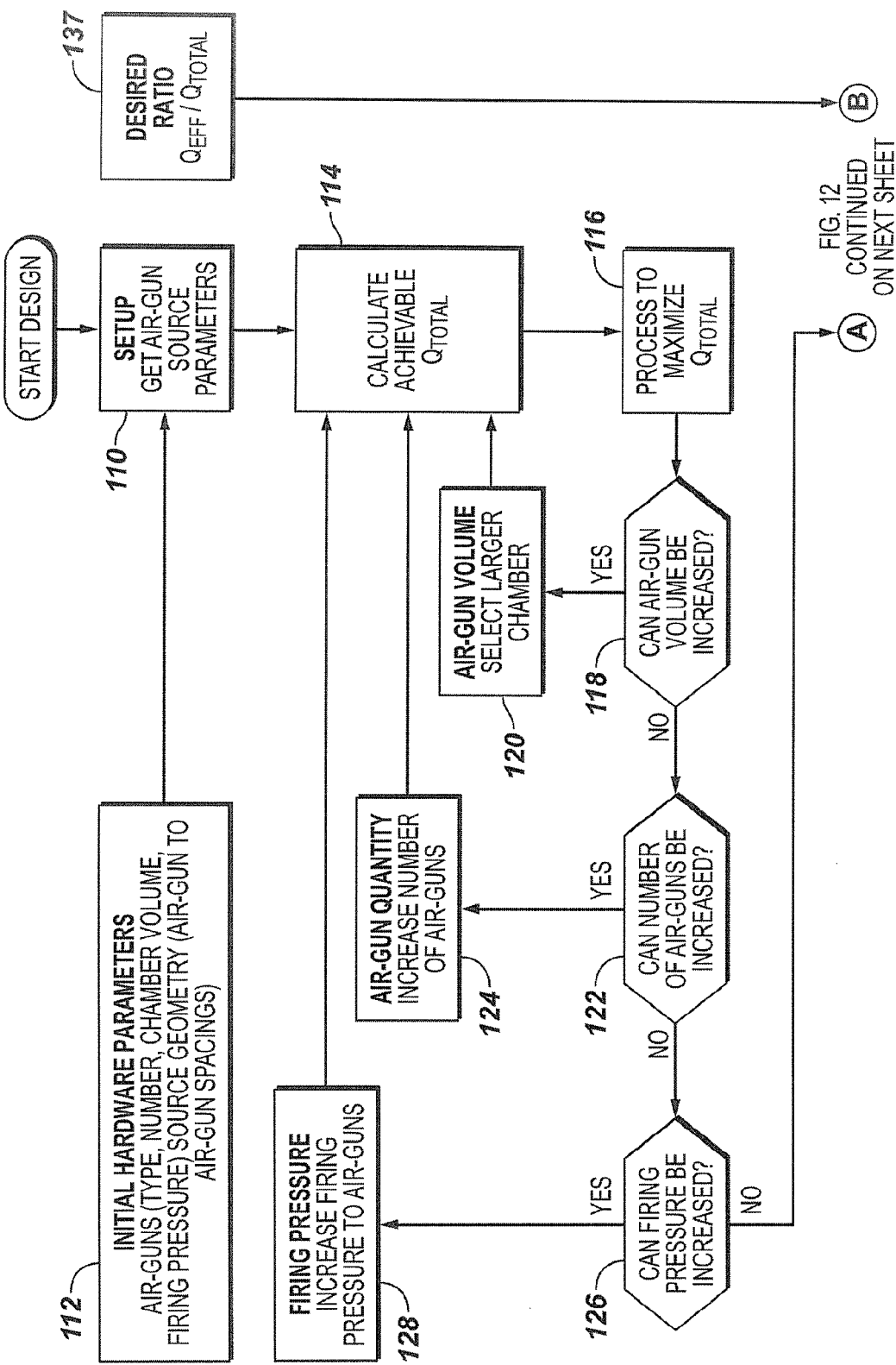
FIG. 12 is a flowchart demonstrating a design application for a low frequency source array.
Figure 12:
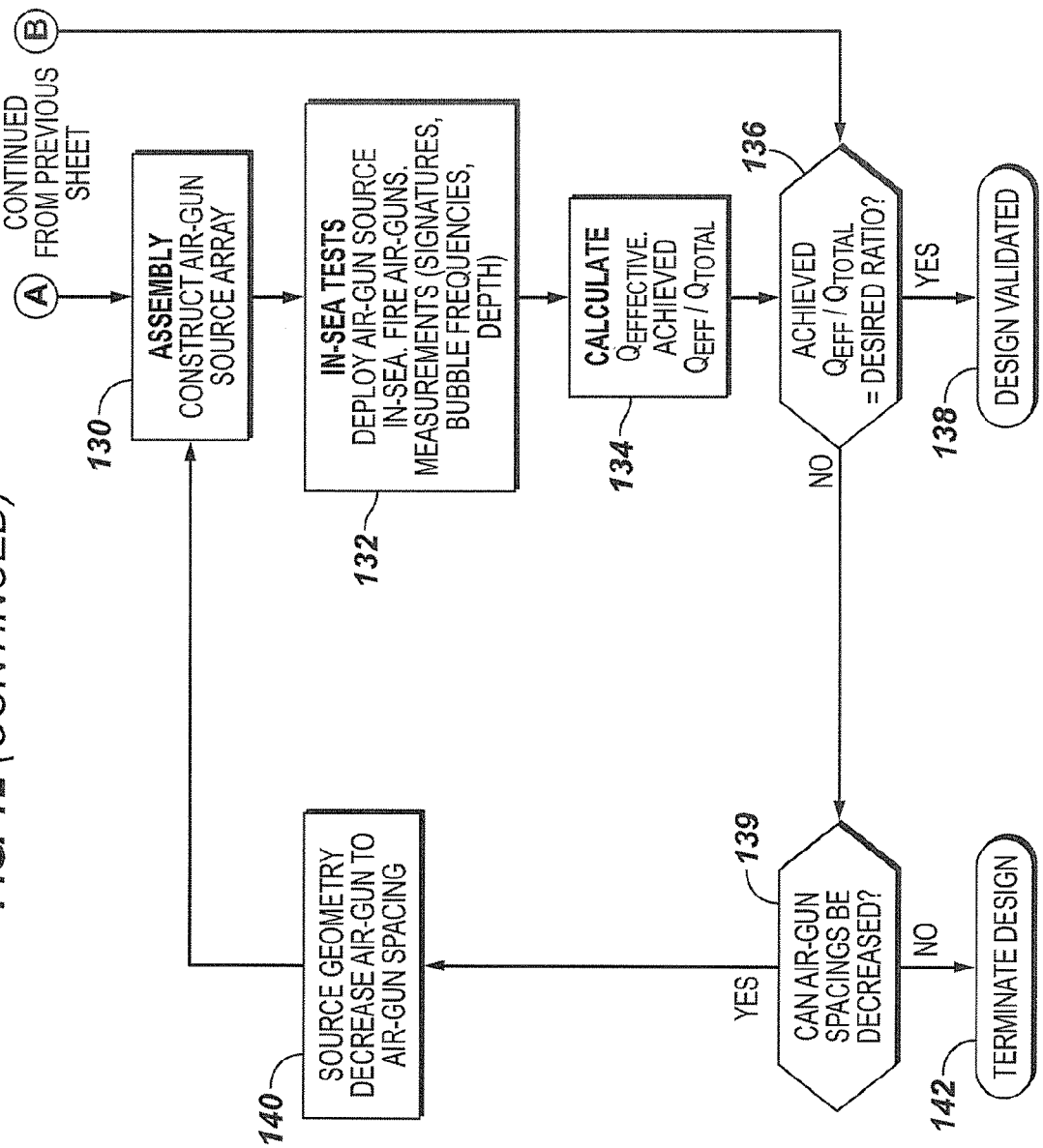

Referring generally to the flowchart of FIG. 12, an example is provided for designing a source which is limited by a given firing pressure, e.g. 2000 psi firing pressure. As illustrated, an initial setup procedure may be performed in which airgun source parameters are obtained, as indicated by block 110. The setup may comprise obtaining initial hardware parameters, e.g. air guns (type, number, chamber volume, firing pressure) and source geometry (airgun to airgun spacings), as indicated by block 112. Following setup, the total bubble energy achievable may be calculated, as indicated by block 114. A variety of processes may be employed to maximize the total possible bubble energy, as indicated by block 116.

For example, a determination may be made whether airgun volume can be increased, as represented by decision block 118. If the volume can be increased, a larger chamber is selected, as indicated by block 120, and this updated information is used in updating the energy calculations (see block 114). Another determination may be whether the number of airguns can be increased, as represented by decision block 122. If the number of airguns can be increased, a larger number is selected as indicated by block 124. Again, this updated information may be used in updating the energy calculations at block 114. Another example of a determination for maximizing total bubble energy may comprise evaluating whether the firing pressure can be increased, as indicated by decision block 126. If the firing pressure can be increased, the increased pressure parameters are determined, as indicated by block 128. This updated information also may be used to update the overall energy calculations at block 114.

If the various parameter values can no longer be increased, the final selected parameter values may be used to facilitate assembly of a desired airgun source array, as indicated by block 130. In-sea tests may then be conducted, as indicated by block 132. For example, the airgun source may be placed in-sea to enable firing of the airguns and obtaining of desired measurements, e.g. signatures, bubble frequencies, and depth. The data is used to calculate an effective bubble energy, as indicated by block 134. This allows determination of whether the ratio of effective bubble energy to total bubble energy achievable is desirable, as indicated by decision block 136. The desired ratio of effective bubble energy to total bubble energy may be input, as indicated by block 137. If the desired ratio is achieved, the design is validated, as indicated by block 138. However, if the desired ratio is not achieved, additional evaluations can be performed. For example, a determination may be made as to whether airgun spacings can be decreased, as indicated by decision block 139. If the airgun spacings can be decreased, another source geometry can then be determined, as indicated by block 140. The new source geometry may be used to facilitate assembly of another source array, as indicated by block 130. However, if the additional evaluations do not suggest a new source geometry, the specific design may be terminated, as indicated by block 142.

Figure 13:
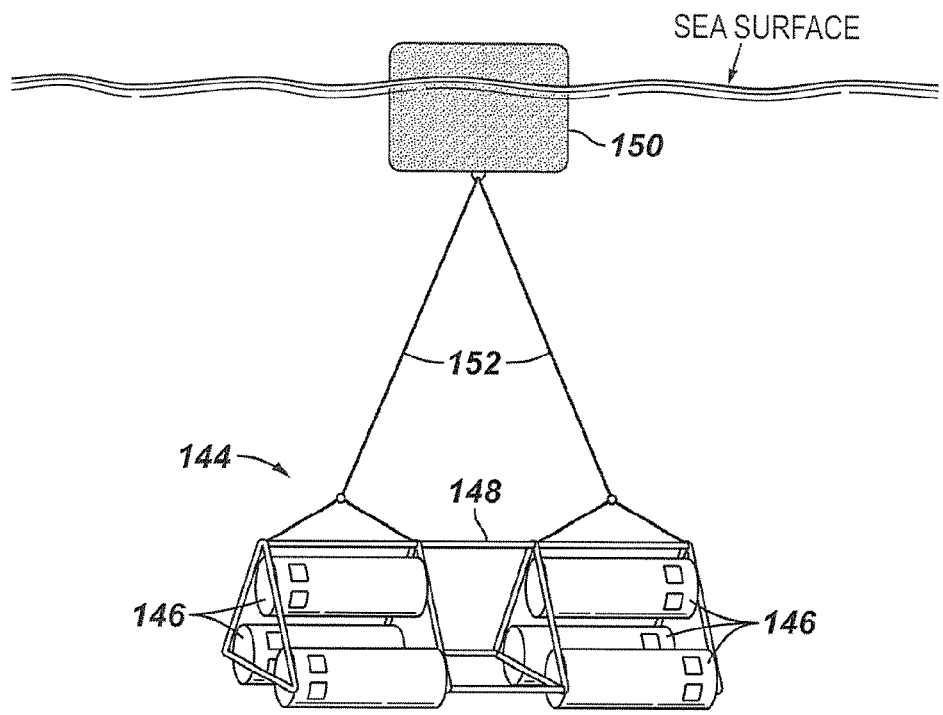
FIG. 13 is a schematic depiction of a source having a plurality of suspended airguns.

FIG. 13 illustrates a source configuration that has been designed according to a present embodiment. In this example, a source 144 (which may be part of a larger source array or may comprise the entire source array) has a total volume of 1500 in³, and comprises six 250 in³ airguns 146 mounted in close proximity. For example, a group of three airguns 146 may be mounted on the first side of a framework 148 and a second group of three airguns 146 may be mounted on a second side of the framework 148. However, the number and arrangement of airguns 146 may be adjusted/changed depending on the parameters of a given application. In the example illustrated, the airguns 146 are suspended from a float 150 via suitable suspension lines 152. When operated with 2000 psi firing pressure at 7 meters depth, for example, and assuming the individual bubbles fully frequency lock, Equation 1 predicts the resulting bubble will oscillate at 5.5 Hz.

With conventional airguns having maximum firing pressure limited to 2000 psi, any attempt to exceed the airgun manufacturer's working pressure rating of 2000 psi poses a potential for problems with respect to equipment and personnel.

By employing a higher flow rate compressor or a high pressure supply reservoir that has the capacity to deliver increased air flow, increasing the volume of the airgun chambers becomes an effective way of further reducing the bubble frequency for seismic source systems. Equation 1 shows that the bubble frequency is inversely proportional to the cube-root of the product of the firing pressure and the airgun chamber volume. Equation 5 shows that the bubble energy is proportional to the firing pressure and volume of the airgun source. Consequently, increasing the airgun chamber volumes from 250 in³ to 350 in³ is equivalent to increasing the total bubble energy by 40%.

Figure 14:
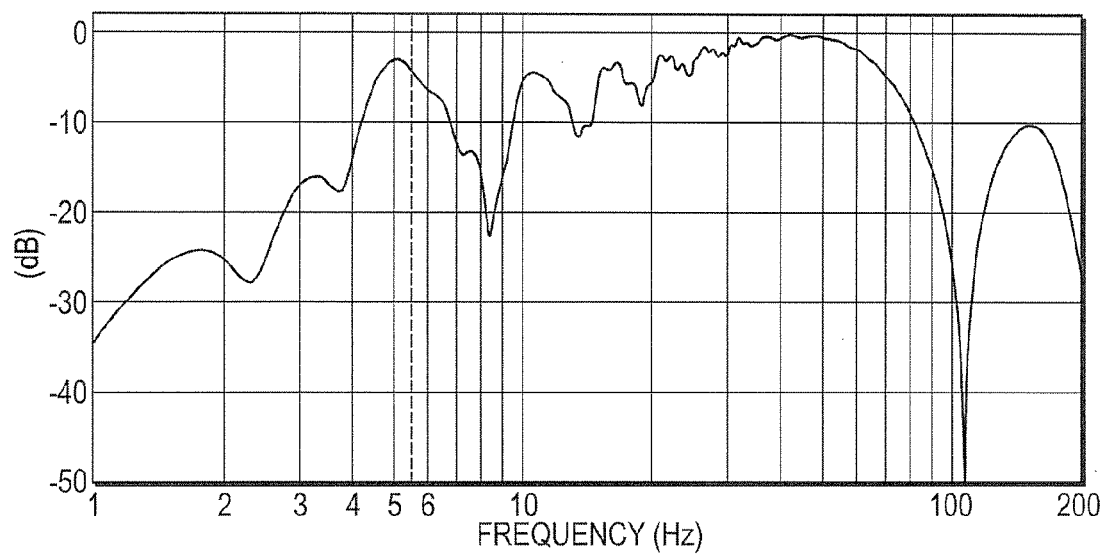
FIG. 14 is a graphical depiction of a measured far field spectrum of the source configuration of FIG. 13.

FIG. 14 shows measured far-field spectra of the 1500 in³ source (illustrated in FIG. 13) operated with 2000 psi firing pressure at 7 meters depth. The vertical dashed line indicates the theoretical bubble resonance frequency calculated with Equation 4. The figure confirms that the six bubbles fully frequency lock at 2000 psi, i.e. the bubbles oscillate with the frequency associated with the total bubble energy.

This low frequency source, with an initial total volume of 1500 in$^3$ subsequently increased to 2100 in$^3$, is the result of the disclosed design method described in FIG. 12. The result of the design process is creation of the largest bubble possible using available airgun chambers to increase the low frequency output and to maximize the total bubble energy, i.e. to maximize $Q_{total}$.

Referring to the flow chart in FIG. 12 and the table below, one example provides initial hardware parameters having a total bubble energy for the source array of $Q_{total}=3000\cdot 10^3$ psi·in$^3$. This initial design example was limited by the total source volume (1500 in$^3$) and the maximum number of airguns (six) within the frame design. However, after reassessing the hardware parameters through the 'process to maximize $Q_{total}$' loop in FIG. 12 it was found that total source bubble energy could be increased to $4200\cdot 10^3$ psi·in$^3$ by fitting larger airgun chamber volumes. The final design in this example is limited by the maximum number of airguns in the frame and the maximum safe firing pressure of the airguns.

|  | Initial parameters | After maximizing $Q_{total}$ |
|---|---|---|
| Number of airguns | 6 | 6 |
| Airgun chamber volumes | 6 · 250 = 1500 in$^3$ | 6 · 350 = 2100 in$^3$ |
| Max safe airgun operating pressure | 2000 psi | 2000 psi |
| $Q_{total}$ | $3000 \cdot 10^3$ psi · in$^3$ | $4200 \cdot 10^3$ psi · in$^3$ |

This design process has maximized the total bubble energy available.

EXAMPLE 7

Increasing the Effective Bubble Energy by Increasing the Firing Pressure

In another example, FIG. 13 may again be used to illustrate a configuration embodiment of the present disclosure. In this example, the source 144 again has a total volume of 1500 in$^3$ and comprises six 250 in$^3$ airguns 146 mounted in close proximity. When operated with 2000 psi firing pressure at 7 meters depth, and assuming the individual bubbles fully frequency lock, Equation 1 predicts the resulting bubble will oscillate at 5.5 Hz.

A majority of seismic surveys operate airgun sources with about 2000 psi firing pressure. This is sometimes considered an industry standard. However, some modern airguns have been designed to operate with 3000 psi maximum firing pressure. The 2000 psi pressure level has traditionally been preferred because of limited compressor capacity, reduced HSE risk and longer service intervals.

Despite this, increasing the source firing pressure is an effective way of further reducing the bubble frequency for seismic source systems that have additional compressor capacity or additional high pressure supply reservoir capacity. Equation 1 shows that the bubble frequency is inversely proportional to the cube-root of the product of the firing pressure and the airgun chamber volume. Consequently, increasing the firing pressure from 2000 to 3000 psi is equivalent to increasing the total bubble energy by 50%, i.e. increasing P from 2000 to 3000 psi in Equation 5.

Figure 15:
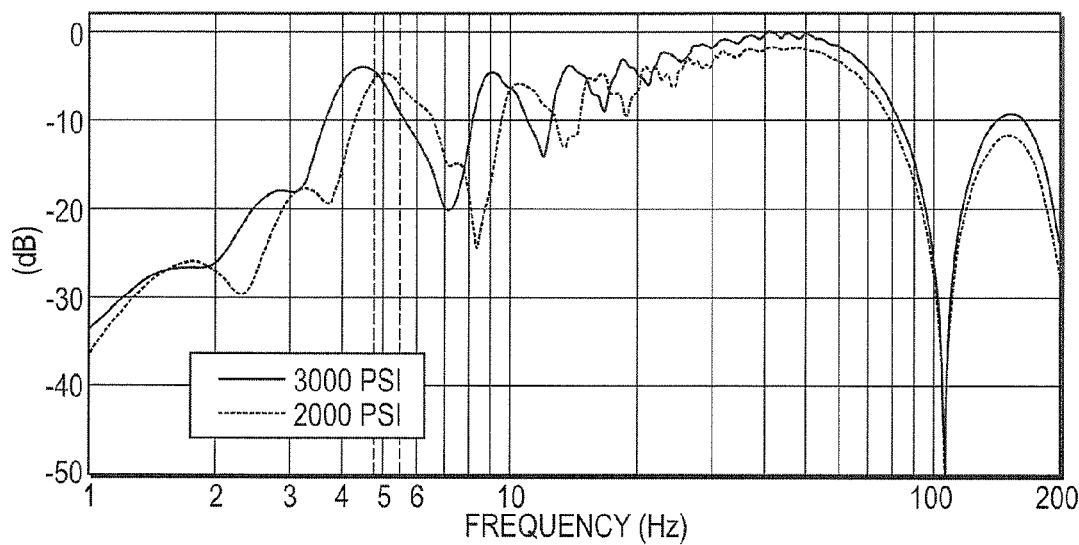
FIG. 15 is a graphical depiction of a measured far field spectrum of the source configuration of FIG. 13 in which at least some of the airguns of the source array are operated at higher firing pressure.

FIG. 15 shows measured far field spectra of the 1500 in$^3$ source 144, illustrated in FIG. 13, operated with 3000 and 2000 psi firing pressure at 7 meters depth. The vertical dashed lines indicate the theoretical bubble resonance frequency calculated with Equation 4. The figure confirms that the six bubbles fully frequency lock at both 2000 and 3000 psi, i.e. the bubbles oscillate with the frequency associated with the total bubble energy. Furthermore, the figure shows that the bubble frequency is significantly lower by increasing the firing pressure from 2000 to 3000 psi.

This low frequency source, with a total volume of 1500 in$^3$ and fired at 3000 psi, is the result of implementing the disclosed design method described in FIG. 12. This design also creates the largest bubble possible within operational constraints to increase the low frequency output. In other words, the design provides a bubble oscillation where the effective bubble energy equals the total bubble energy, and for which the total bubble energy is maximized, i.e., maximize $Q_{total}$ and design the source such that $Q_{eff}/Q_{total}=1$. This result is quite different from the results of prior art source designs. For conventional sources the inter-gun spacing and the distribution of bubble frequencies are normally chosen to achieve maximum spectral flatness, while in this case we aim to emit only one bubble frequency: the oscillation frequency associated with the total air supply capacity available.

Referring to the flow chart in FIG. 12 and the table below, the initial hardware parameters provide a total bubble energy for the source array of $Q_{total}=2400\cdot 10^3$ psi·in$^3$. The initial design was limited by the total source volume (1200 in$^3$) and the maximum operating pressure for the chosen airgun type (2000 psi). However, after reassessing the hardware parameters through the 'process to maximize $Q_{total}$' loop in FIG. 12 it was found that total source bubble energy could be increased to $4500\cdot 10^3$ psi·in$^3$ by replacing the airgun type with one that is designed to safely operate at 3000 psi and by increasing the airgun chamber volumes. The final design may be limited by the number of airguns and the maximum airgun chamber volume considered.

|  | Initial parameters | After maximizing $Q_{total}$ |
|---|---|---|
| Number of airguns | 6 | 6 |
| Airgun chamber volumes | 3 · 250 + 3 · 150 = 1200 in$^3$ | 6 · 250 = 1500 in$^3$ |
| Max safe airgun operating pressure | 2000 psi | 3000 psi |
| Available air supply capacity | 2000 in$^3$ at 3000 psi | 2000 in$^3$ at 3000 psi |
| $Q_{total}$ | $2400 \cdot 10^3$ psi · in$^3$ | $4500 \cdot 10^3$ psi · in$^3$ |

The first part of the design process aims to maximize the total bubble energy available, while the second part of the design process aims to release all the bubble energy available into one bubble frequency. This is achieved by fully frequency locking the bubble oscillation for the air released from the six airguns 146 which may require compact source geometry. The table below shows how the outer dimensions of the source shrunk following the second part of the design process outlined in FIG. 12:

|  | Initial design | Final design |
|---|---|---|
| Source outer dimensions in meters | 0.9 × 0.8 × 3.0 | 0.9 × 0.8 × 1.5 |
| $Q_{eff}$ | <$Q_{total}$ | $4500 \cdot 10^3$ psi · in$^3$ |

EXAMPLE 8

Clustering Airguns Charged with Different Firing Pressure

In this example, the airguns 146 illustrated in FIG. 13 provide a special cluster configuration. It is the result of optimizing the low frequency output when only specific airguns are available and with limited high pressure air supply capacity.

For this example, an assumption can be made that the high pressure reservoir has a maximum output capacity of 1200 in$^3$ at 2000 psi per shot and that only six 250 in$^3$ airguns are available to use in our source design. Additionally, the desired optimization of low frequency output in this example is to maximize the low frequency output.

To maximize the low frequency output the largest possible bubble is created and this can be achieved by frequency locking as many of the 250 in$^3$ airguns as possible. However, in this example we are limited by air supply capacity: the total potential bubble energy available from the supply is $2000 \cdot 1200 = 2400 \cdot 10^3$ psi·in$^3$. Consequently, if one charges the airguns with 2000 psi one can only fire four 250 in$^3$ airguns before running out of air supply ($2000$ psi·250 in$^3 \cdot 4 = 2000 \cdot 10^3$ psi·in$^3$).

Therefore, to utilize the full air supply capacity, it is better to charge all six 250 in$^3$ airguns with 1600 psi, such that the total bubble energy of the array is $1600$ psi·250 in$^3 \cdot 6 = 2400 \cdot 10^3$ psi·in$^3$. In this particular example, however, three of the airguns (e.g. left side in FIG. 13) are fired at 2000 psi and the other three (e.g. right side in FIG. 13) at 1200 psi, which gives the equivalent total bubble energy: $2000 \cdot 250 \cdot 3 + 1200 \cdot 250 \cdot 3 = 2400 \cdot 10^3$ psi·in$^3$.

Figure 16:
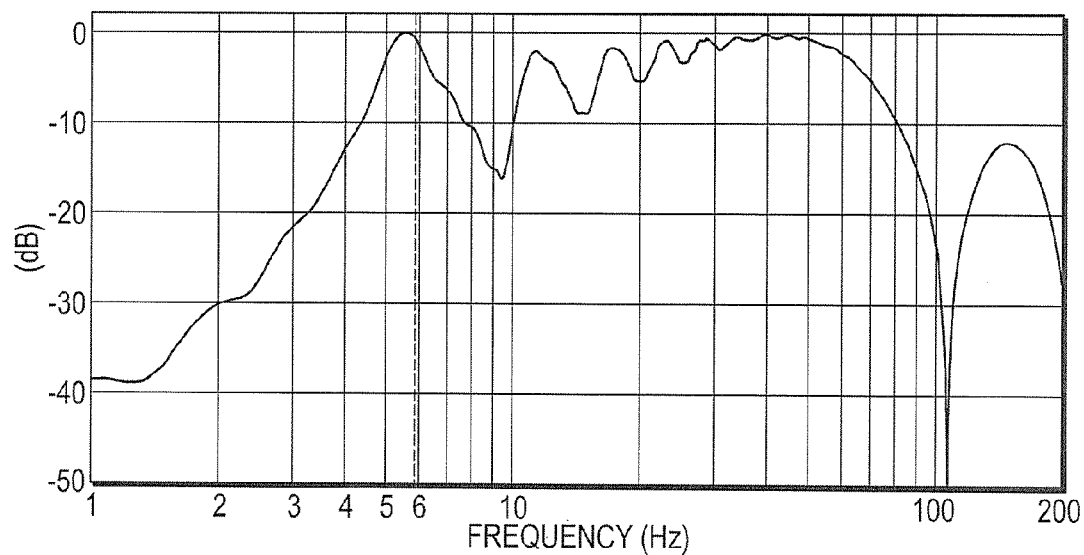
FIG. 16 is a graphical depiction of a measured far field spectrum of the source configuration of FIG. 13 in which at least some of the airguns of the source array are charged to a higher pressure level than other airguns of the source array.

FIG. 16 shows a measured farfield spectrum of the resulting source. (See FIG. 13 and the resulting source example described in the preceding paragraph. For this example, FIG. 16 graphically illustrates measured farfield spectrum of the source configuration described in the preceding paragraph in which the source depth is 7 meters.) The dashed vertical line indicates the theoretical bubble frequency for $Q = 2400 \cdot 10^3$ psi·in$^3$ at the deployed source depth (7 meters). The fundamental bubble frequency of the measured spectrum coincides well with the theoretical prediction, which demonstrates that the source 144 is utilizing the full air flow capacity in the resulting bubble oscillation as desired.

EXAMPLE 9

Source Array Wherein the Largest Bubble is One-Third of the Total Source Volume Example 9 is similar to Example 1 discussed above, but the present example incorporates the effective bubble energy framework. In Example 9, one aspect is release of the largest quantity of high pressure gas possible into one location to maximize the very low frequency output. There may be several factors limiting the largest bubble in an array. For example, the total source volume may be limited by the onboard compressor capacity and the seismic shot interval. The total source volume also may be limited by the flow capacity of the conduits (e.g., hoses) connecting the source and the onboard compressor or onboard high pressure reservoir, or it might be limited by the number of high pressure hoses the ship can tow.

Similarly, the largest bubble in the source array might be limited by how much of the total source volume can be released into substantially one location. FIG. 5 may again be referenced as depicting an embodiment of the present disclosure where the largest bubble is limited by the flow capacity of the high pressure hoses that connects the source to the vessel 60. As described in the previous embodiment, vessel 60 tows a source array 62, which includes the pair of substantially identical subarrays 64 disposed about another subarray 66 (which includes the pair of single airguns 67 disposed about cluster 68 in the in-line direction). The cross-line spacing between subarrays 64 and 66 is, for example, 6 meters and the in-line spacing between each of the single airguns 67 and the cluster 68 is, for example, 6 meters. In the present embodiment, each subarray 64, 66 is charged by a shipborne high pressure reservoir via one high pressure hose, whose flow capacity is approximately 2100 in$^3$ at 2000 psi per shot. The subarrays 64, 66 are charged to the same pressure level, and the source array 62 may be further limited by how close one can place two hoses, and consequently it may not be possible to frequency lock the bubbles from different subarrays. Hence, the largest bubble is 2100 in$^3$. The bubble frequency associated with 2100 in$^3$ is achieved by fully frequency locking six 350 in$^3$ airgun bubbles, while the bubble frequency associated with 1050 in$^3$ is achieved by fully frequency locking two 525 in$^3$ airgun bubbles. The dashed lines indicate the regions with full frequency locking. The interaction between the regions is negligible, and it is also negligible between any region and any of the single airgun bubbles.

The effective bubble energy of the subarrays 64 is substantially $2000$ psi·2100 in$^3 = 4200 \cdot 10^3$ psi·in$^3$, while the subarray 66 has two distinct bubble frequencies: the frequencies associated with bubble volumes of 1050 in$^3$ and 525 in$^3$. These volumes result in bubble frequencies that are 1/3 and 2/3 of an octave higher than the lowest bubble frequency. In this example, the outer subarrays 64 have been optimized according to the present disclosure, while the subarray 66 is used to fill-in the bubble notch frequencies in order to flatten the spectrum in a conventional manner. In this example, the effective bubble energy of the largest bubble is approximately 33.3% of the total potential bubble energy, i.e. $2000 \cdot 2100 = 4200 \cdot 10^3$ psi·in$^3$ out of a total of $2000 \cdot 6300 = 12600 \cdot 10^3$ psi·in$^3$.

EXAMPLE 10

Source Array Wherein the Largest Bubble Equals the Total Source Volume

Example 10 is similar to Example 2 discussed above, but the present example incorporates the effective bubble energy framework. Referring again to FIG. 6, this figure depicts a schematic view of another type of source relative to that disclosed in Example 8, wherein all of the released gas is frequency locked into one very large airgun bubble. In FIG. 6, the source 70 comprises twenty-one 300 in$^3$ airgun bubbles arranged on a hexagonal grid in three layers. In this example, the airguns are again connected to the plurality of high pressure hoses 72, which extend from vessel 74. With this arrangement, the high pressure hoses 72 terminate at substantially the same location, thus enabling the guns to be positioned within full frequency locking distance. All twenty-one airgun bubbles are fully frequency locked and oscillate with the period associated with the combined volume, e.g. 6300 in$^3$. Thus, the volume of the largest effective bubble equals the total source volume. Although a specific number of airguns with specific bubble volumes are described in this example, it is to be appreciated that such numbers and volumes may be altered while still enabling full frequency locking of the array.

FIG. 7 compares the modeled spectra of a conventional source and two of the new sources designed according to the present invention. The firing pressure is 2000 psi for all three cases. FIG. 7 compares the conventional source illustrated in FIG. 4 (dotted curve), in which the effective bubble energy of the largest bubble is 15% of the total bubble energy of the array; the new source illustrated in FIG. 5 (dashed curve), in which the effective bubble energy of the largest bubble is approximately 33% of the total bubble energy of the array; and the new source shown in FIG. 6 (solid curve), in which the effective bubble energy is 100% of the total bubble energy of the array.

For the purposes of this embodiment, the comparison of FIG. 7 further demonstrates how the low frequency output increases with the effective bubble energy as both the dashed and the solid curves have significantly more low frequency output than the conventional reference spectrum (dotted curve).

EXAMPLE 11

Source Array Wherein the Largest Bubble Equals Half of the Total Source Volume

Example 11 is similar to Example 3 discussed above, but the present example incorporates the effective bubble energy framework. In some embodiments, additional gas for tuning the source array by creating other distinct bubble frequencies may be desired. The flowchart of FIG. 12 shows how a source can be designed, or re-designed, to take this into account. That is, an optimum low frequency source may be designed, while maintaining some spectral flatness given design restrictions imposed by the available equipment.

In block 137 'Desired Ratio' of FIG. 12, the desired ratio of the effective bubble energy of the largest bubble to the total source bubble energy is determined. This ratio affects the trade-off between maximizing the low frequency output and flattening the spectrum by introducing additional bubble frequencies to fill-in the spectral notches. In this example, the desired effective bubble energy of the largest bubble is two-thirds of the total source bubble energy available per shot.

In block 134 'Calculate $Q_{effective}$' of FIG. 12, the design procedure establishes the largest effective bubble energy that may be practically achieved given the restrictions imposed by the available equipment. For example, the total source bubble energy per shot is limited by the flow capacity per high pressure gas hose and by the number of hoses available. Referring to the source layout of FIG. 9, for example, an implementation is illustrated in which only two gas hoses 90, 92 from a high pressure reservoir, e.g. the shipboard compressor, and a submerged source array 94 are available. Each hose has a flow capacity of, for example, 1680 in³ at 2000 psi per shot. Thus, in this example, the desired effective energy of the largest bubble is 2000·(1680+1680)·2/3=2000·2240= 4480·10³ psi·in³. However, in this example, the largest effective bubble energy is further limited by how close the two strings can be positioned to avoid tangling of the equipment while towing, so it is not possible to frequency lock gas bubbles from different strings. Consequently, the actual effective energy of the largest bubble may be 2000·1680=3360·10³ psi·in³.

Referring again to FIG. 12, block 130 'Assembly' contemplates design of an airgun cluster arrangement 96 (see FIG. 9) to achieve the largest bubble energy (i.e. the one that results in the 2000·1680=3360·10³ psi·in³ effective bubble energy) which corresponds to the total bubble energy available from one gas hose. In this example, the desired bubble frequency is achieved with six 280 in³ airguns in close proximity.

Block 130 'Assembly' also can be used to design other bubble frequencies in the array. For example, instead of maximizing the low frequency output by duplicating the airgun arrangement described above, another airgun subarray 98 may be arranged to use the remaining gas to flatten the spectrum. In this example, three additional bubble frequencies may be uniformly distributed, on a linear frequency scale, between the first bubble frequency and its first harmonic. The Rayleigh-Willis formula in Equation 1 gives the effective bubble volume of these other bubble frequencies: $V_2$=1680/ $(1.25)^3$≈860 in³, $V_3$=1680/$(1.50)^3$≈498 in³, $V_4$=1680/ $(1.75)^3$≈313 in³. All airguns may be fired at 2000 psi. In this example, the second largest bubble volume, $V_2$, is created by a three gun cluster having two 250 in³ guns and one 360 in³ gun. Similarly, $V_3$ is created by a two gun cluster having two 250 in³ guns, and $V_4$ is a single airgun of 310 in³. The desired bubble energy ratio for the four bubbles is: 2000·1680/ (6720·10³)=0.5 for the largest bubble, 2000·860/(6720· 10³)≈0.26 for the second bubble, 2000·500/(6720·10³)≈0.15 for the third bubble, and 2000·310/(6720·10³)≈0.09 for the fourth bubble. Referring again to FIG. 12, each of the frequency locked bubbles can be designed via the second part of the flow chart by inputting the respective bubble energy ratio in block 137 'Desired ratio'.

Accordingly, the design of the layout in FIG. 9 achieves a largest effective bubble energy that is 50% of the total bubble energy of the source, while also achieving spectral flattening using three additional bubble frequencies that are uniformly distributed between the frequency of the largest bubble and its first harmonic. The spectral flattening of this array is illustrated in FIG. 10.

EXAMPLE 12

Redesign of a Conventional Cluster Source

Example 12 is similar to Example 4 discussed above, but the present example again incorporates the effective bubble energy framework. In this example, useful methods are provided for redesigning existing cluster arrays to optimize low frequency output. FIG. 11A depicts the layout of a conventional cluster source deployed in dual mode as described in U.S. Pat. No. 4,956,822. The prior art cluster source has been designed for enhanced spectral flatness, i.e. high primary-to-bubble ratio, with little regard for the very low frequency source output.

The value of the effective bubble energy, $Q_{eff}$, can be calculated using the formula in Equation 6 and inputting values for air pressure (e.g., 2000 psi), source depth (e.g, 10 ft) and bubble frequency (e.g. 1/196.5 ms≈5.089 Hz).

Accordingly, use of these exemplary values leads to a maximum effective bubble energy of only 1894·10³ psi·in³, i.e. 39% of the total bubble energy of the array (2000·2400=4800·10³ psi·in³). Although exemplary values were used to define the maximum effective bubble volume of the configuration of FIG. 11A, it is to be appreciated that this definition can be used to quantify the effective bubble energy of any prior art source.

According to the principles of the present disclosure, such source can be redesigned to maximize the low frequency output while using the same total amount of compressed air and maintaining some spectral flatness. Assuming that the firing pressure is the same, i.e. 2000 psi, the source depth is the same, i.e. 10 ft, and that the total volume cannot exceed 2400 in³ and that there are no other restrictions on how the total volume can be distributed, the source can be redesigned to have two distinct bubble frequencies. The first bubble frequency may be defined as low as possible and the second bubble frequency may be designed as being half an octave higher than the first bubble frequency, such that the second bubble frequency will coincide with the bubble notch of the first bubble frequency. This restriction can be expressed as $$Q_{\mathit{eff,max}} \cdot (1+2^{-3/2}) = Q_{tot} \quad (7)$$

In other words, the effective bubble energy of the largest bubble may be approximately 74% of the total bubble energy of the source. The firing pressure in the present source embodiment may be similar to that of previous embodiments (e.g. 2000 psi). Consequently, at 2000 psi, the first bubble may oscillate with a frequency associated with 1773 in$^3$ (about 74% of 2400) and the second bubble may oscillate with a frequency associated with 627 in$^3$ (about 26% of 2400). Similar to the other examples disclosed herein, such bubble oscillations are obtained by fully frequency locking multiple airgun bubbles in close proximity.

The redesigned low frequency source is depicted in FIG. 11B as having a pair of cluster units 100, 102, including: a 1773 in$^3$ bubble, which may be constructed from six 295.5 in$^3$ guns, and a 627 in$^3$ bubble, which may be constructed from two 313.5 in$^3$ guns. The two cluster units are well separated such that the interaction between the cluster units is negligible. Redesigning clusters according to the principles disclosed herein increases the effective bubble energy from 1894·10$^3$ psi·in$^3$ to 2000·1773=3546·10$^3$ psi·in$^3$, which at 10 ft depth and 2000 psi firing pressure corresponds to a bubble frequency of 5.1 and 4.1 Hz respectively. Accordingly, the bubble frequency has been shifted by 0.3 octave by redesigning the cluster source layout.

As described above, sources and source arrays may be used, arranged, and/or positioned to optimize low frequency output. For example, the bubble size and/or pressures applied may be selected individually or in combination to optimize low frequency output from airgun source arrays. In some applications, the methodology comprises deploying a plurality of air guns and activating at least some of the airguns to generate an effective bubble energy as described in the embodiments above. For example, the airguns may be activated to generate an effective bubble energy of more than 4000·10$^3$ psi·in$^3$. In other applications, at least some of the airguns may be activated to generate multiple frequency locked bubbles such that the largest effective bubble energy is greater than 10000·10$^3$ psi·in$^3$. As described herein, the activating also may comprise generating effective bubble energy in which the largest bubble has effective bubble energy greater than 3000·10$^3$ psi·in$^3$ and in which the largest bubble comprises multiple frequency locked bubbles. In this example, the effective bubble energy of the largest bubble is between 33% and 74% of the total potential bubble energy fired at each shot. However, the largest bubble effective bubble energy and the ratio of the largest bubble effective bubble energy to the total potential bubble energy may vary depending on the parameters of a specific application.

In similar applications, the methodology comprises providing a plurality of air guns and identifying a largest effective bubble energy for a marine source array. At least some of the airguns may be arranged to achieve the largest effective bubble energy upon activation of those airguns. However, the effective bubble energy of at least some of the plurality of airguns may be optimized according to other parameters. Additionally, the airguns may be arranged in close proximity to one another and the airguns may be activated to fully frequency lock the bubbles emitted by the airguns. In any of these applications, the effective bubble energy and the ratio of effective bubble energy to potential bubble energy may be selected according to the needs/parameters of the seismic application. In a variety of these examples, at least some of the airguns may be activated to generate an effective bubble energy of more than 4000·10$^3$ psi·in$^3$ and/or those airguns may be activated to generate multiple frequency locked bubbles such that the largest effective bubble energy is greater than 10000·10$^3$ psi·in$^3$ as discussed above. Similarly, the activating also may comprise generating effective bubble energy where the largest bubble has effective bubble energy greater than, for example, 3000·10$^3$ psi·in$^3$ and in which the largest bubble comprises multiple frequency locked bubbles. By way of example, the effective bubble energy of the largest bubble in these latter examples may similarly be between 33% and 74% of the total potential bubble energy fired at each shot. Again, however, these values are provided as examples and the effective bubble energy values and ratio values can change depending on the parameters of a given seismic application.

Although specific embodiments of the invention have been disclosed herein in some detail, this has been done solely for the purposes of describing various features and aspects of the invention, and is not intended to be limiting with respect to the scope of the invention. For example, although many of the drawings depict the use of towed source arrays, the teachings of the present disclosure are also applicable to source designs for vertical seismic profiling (VSP) surveys in which substantially stationary source arrays may be substituted for towed source arrays. In VSP applications, receivers can be deployed in the borehole with a variety of methods and systems, including a wireline cable; a downhole assembly, e.g. drill collars; permanent fixation to a side of the borehole; or with other suitable techniques. It is therefore contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A system for increasing low frequency output of a marine source array, comprising:
a plurality of airguns arranged such that the airguns are held by a framework in sufficiently close proximity to one another to generate an effective bubble energy of more than 4000·10$^3$ psi·in$^3$ for at least some of the airguns.

2. A system according to claim 1, wherein bubbles emitted by the airguns when activated are substantially frequency-locked.

3. A system according to claim 1, wherein the effective bubble energy of the largest bubble emitted by the airguns is at least one third of the total potential bubble energy with respect to each shot of the airguns.

4. A system according to claim 1, further comprising a high-pressure reservoir coupled to the plurality of airguns via at least two high-pressure hoses.

5. A system according to claim 1, wherein at least some of the airguns are charged with a different firing pressure level than other airguns of the plurality of airguns.

6. A system according to claim 1, wherein at least some of the airguns generate multiple substantially frequency-locked bubbles such that the largest effective bubble energy is greater than 10000·10$^3$ psi·in$^3$.

7. A system for increasing low frequency output of a marine source array comprising:
a plurality of airguns arranged such that the airguns are held by a framework in sufficiently close proximity to one another to generate an effective bubble energy such that the largest bubble has an effective bubble energy greater than $3000 \cdot 10^3$ psi·in$^3$, further wherein the largest bubble comprises multiple substantially frequency-locked bubbles, and wherein the effective bubble energy of the largest bubble is between 33% and 74% of the total potential bubble energy fired at each shot.

8. A system according to claim 1, wherein the effective bubble energy can be calculated by the formula:

$$Q_{\mathit{eff}} = k^3 \frac{\left(1 + \frac{d}{10}\right)^{\frac{15}{6}}}{f_{obs}^3}$$

where $Q_{\mathit{eff}}$ is the effective bubble energy, fobs is the observed bubble frequency, d is the source depth, and k is an empirical constant.

* * * * *